US007072329B2

(12) United States Patent
Willars et al.

(10) Patent No.: US 7,072,329 B2
(45) Date of Patent: Jul. 4, 2006

(54) COMBINING DIFFERING TRANSPORT TECHNOLOGIES IN A TELECOMMUNICATIONS SYSTEM

(75) Inventors: Per Willars, Stockholm (SE); David Comstock, Sollentuna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 1183 days.

(21) Appl. No.: 09/842,027

(22) Filed: Apr. 26, 2001

(65) Prior Publication Data
US 2001/0053145 A1 Dec. 20, 2001

Related U.S. Application Data

(60) Provisional application No. 60/205,569, filed on May 22, 2000.

(51) Int. Cl.
H04L 12/66 (2006.01)
(52) U.S. Cl. ...................... 370/352; 370/469
(58) Field of Classification Search ............ 300/352, 300/353, 354, 384, 466, 467, 401, 395.52, 300/395.51, 395.5, 230, 469
See application file for complete search history.

(56) References Cited

U.S. PATENT DOCUMENTS 6,374,112 B1 * 4/2002 Widegren et al. ........ 455/452.2

(Continued)

FOREIGN PATENT DOCUMENTS

WO 99/01991 1/1999

(Continued)

OTHER PUBLICATIONS

Mobility in the Broadband Environment Based on IN Evolution, (online) Jun. 1999, Retrieved from the Internet, pp. 23-35.

(Continued)

*Primary Examiner*—Hassan Kizou
*Assistant Examiner*—Ricardo Pizarro
(74) *Attorney, Agent, or Firm*—Nixon & Vanderhye, P.C.

(57) ABSTRACT

In a multi-layer telecommunications system which includes an application layer and a transport layer, differing transport technologies are interworked without terminating the application layer signaling or without involving a technology interworking in the control plane of the application layer (e.g., without interworking in the application signaling). In various illustrated embodiments, the application layer is a radio network layer of a wireless telecommunications system. In at least some embodiments of the present invention a transport layer interworking function is situated on an interface between two nodes of the radio access network (RAN). The interworking function can be located in a separate node which may be a node having both ATM and internet protocol (IP) interfaces. There are numerous modes of implementing the interworking of the present invention, regardless of which interface is affected (e.g., an Iur interface, an Iu interface, or an Iub interface). A first interworking mode involves interworking with q.aal2 signaling. There are various ways or options of implementing the interworking with q.aal2 signaling. A first such example option is to use an IP specific signaling protocol over the IP network. A second example option is to use q.aal2 signaling over the IP network to/from the IP node. In one of its aspects, the present invention also provides an optimization feature in the event that nodes on both side of the interface (Iu interface, Iur interface, or Iub interface) are IP-connected nodes. Another interworking mode involves obtaining address and binding identifier parameters to be included in application signaling messages by consulting a transport layer interworking gateway. Yet another mode of implementing interworking for the present invention involves tunneling.

66 Claims, 20 Drawing Sheets

U.S. PATENT DOCUMENTS

| | | | | |
|---|---|---|---|---|
| 6,490,284 B1 * | 12/2002 | Graf | .......................... | 370/395.2 |
| 6,621,793 B1 * | 9/2003 | Widegren et al. | ........ | 370/230.1 |
| 6,801,542 B1 * | 10/2004 | Subbiah | ...................... | 370/467 |
| 6,879,566 B1 * | 4/2005 | Raivio et al. | ............ | 370/310.1 |
| 6,891,833 B1 * | 5/2005 | Caves et al. | ............. | 370/395.2 |

FOREIGN PATENT DOCUMENTS

| | | |
|---|---|---|
| WO | 99/52307 | 10/1999 |
| WO | 99/53704 | 10/1999 |
| WO | 00/14994 | 3/2000 |

OTHER PUBLICATIONS

Nynashamn, "Iu Interface Control Plane Based on SCCP/IP Protocol Stack", TSG-SA Working Group 2 (Architecture), Mar. 15-19, 1999, pp. 1-9.

* cited by examiner

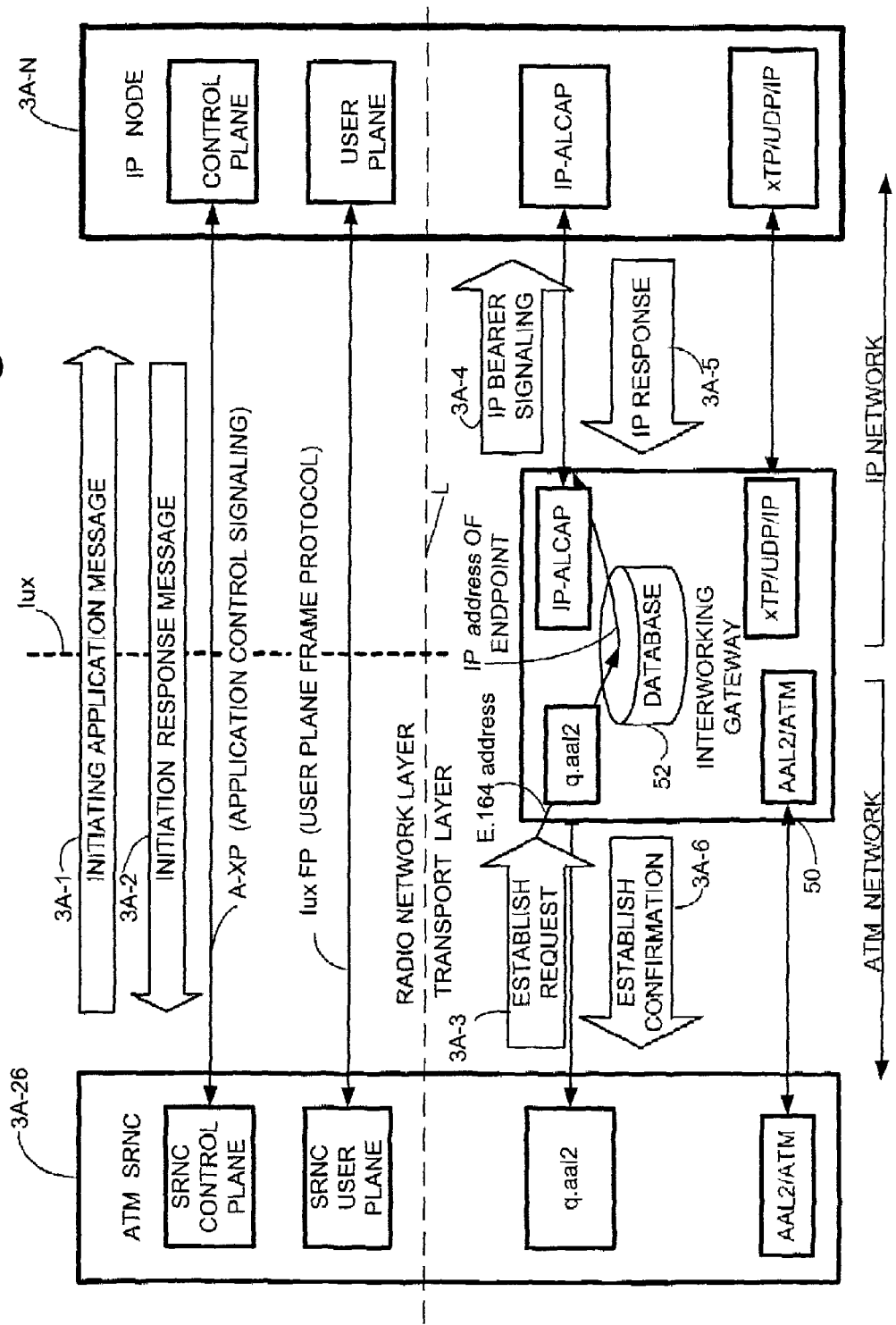

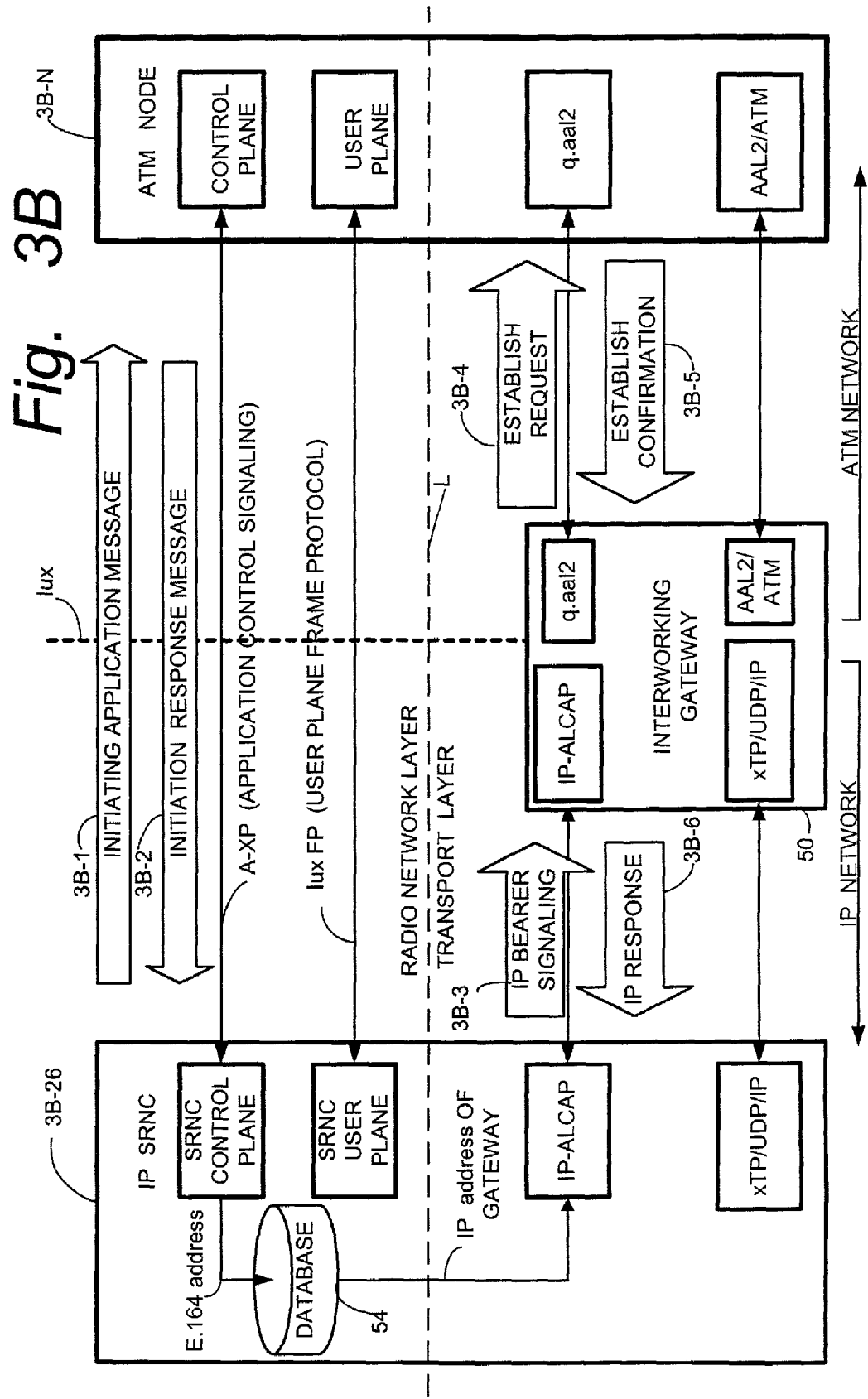

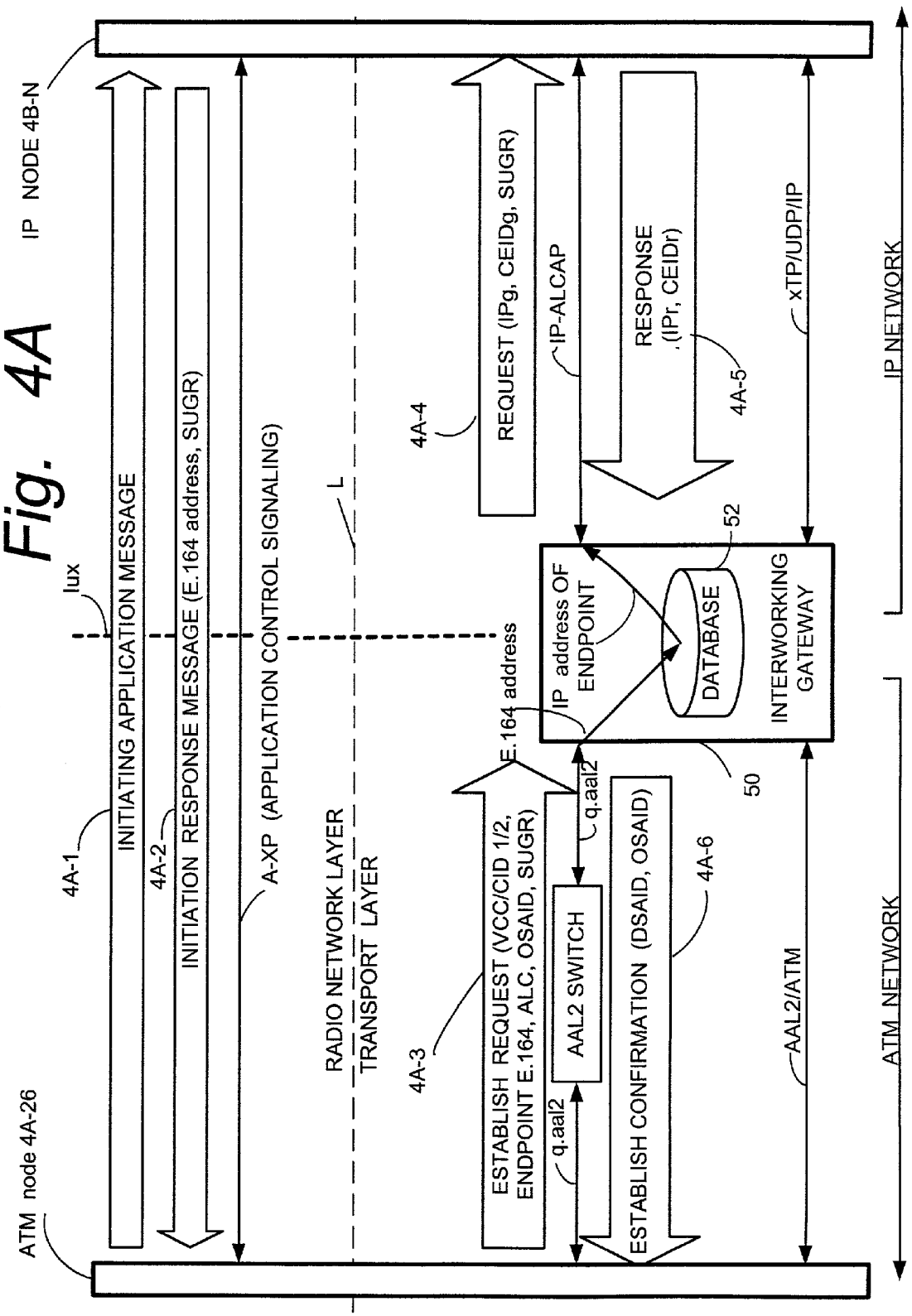

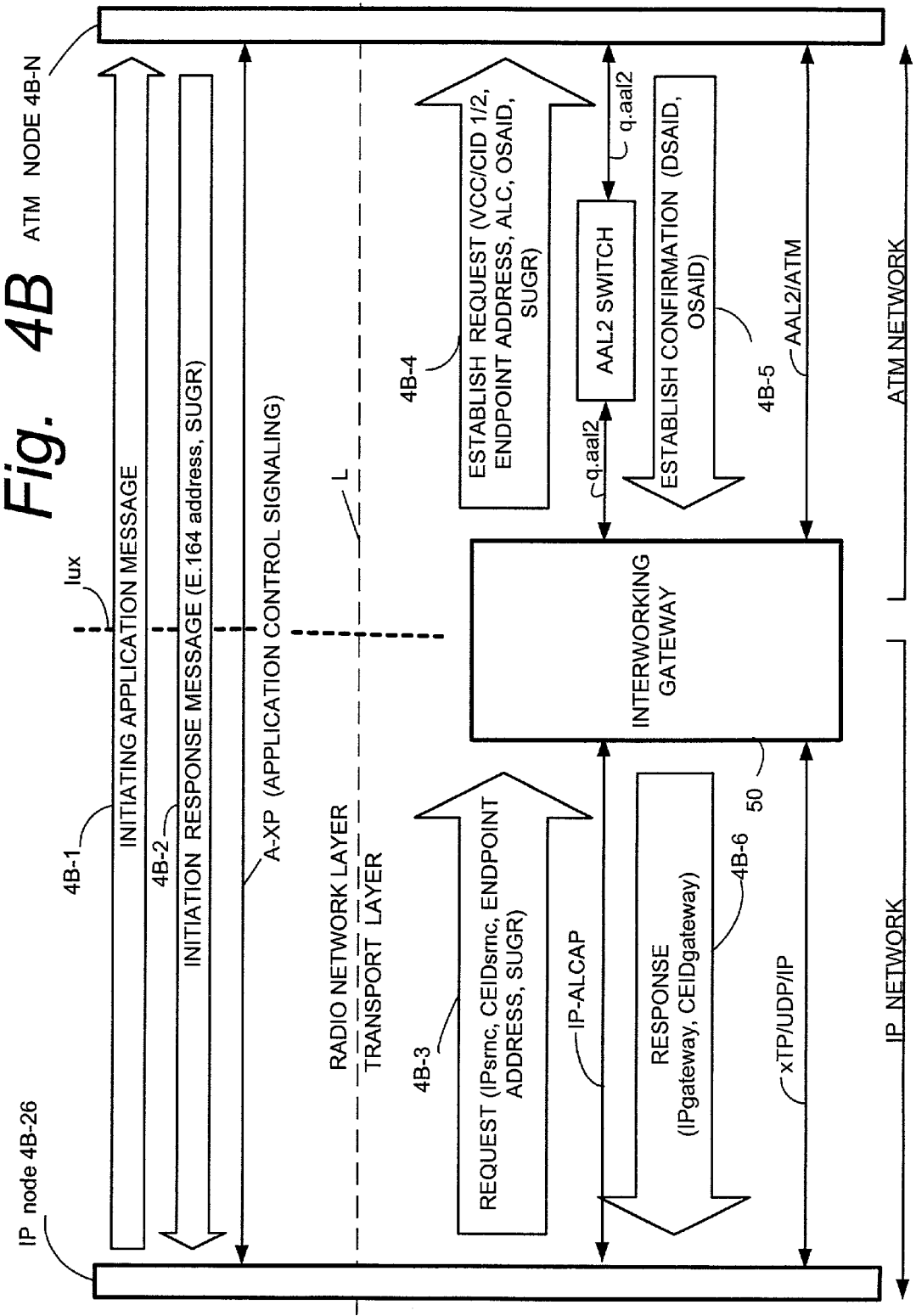

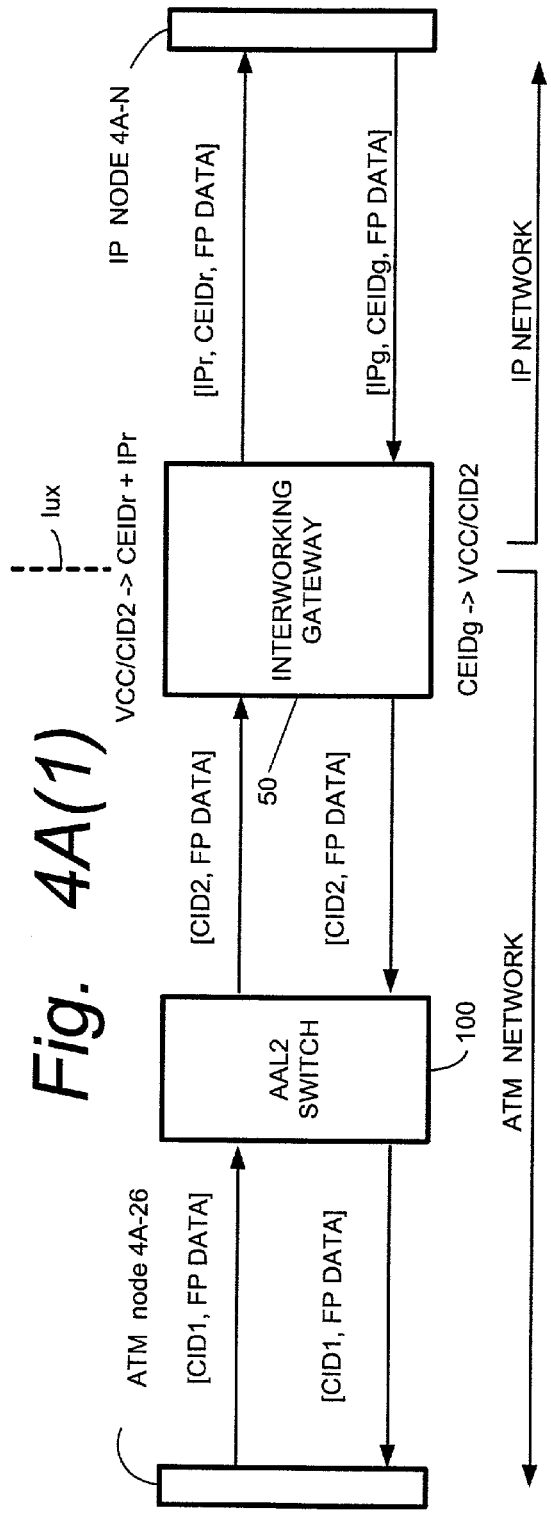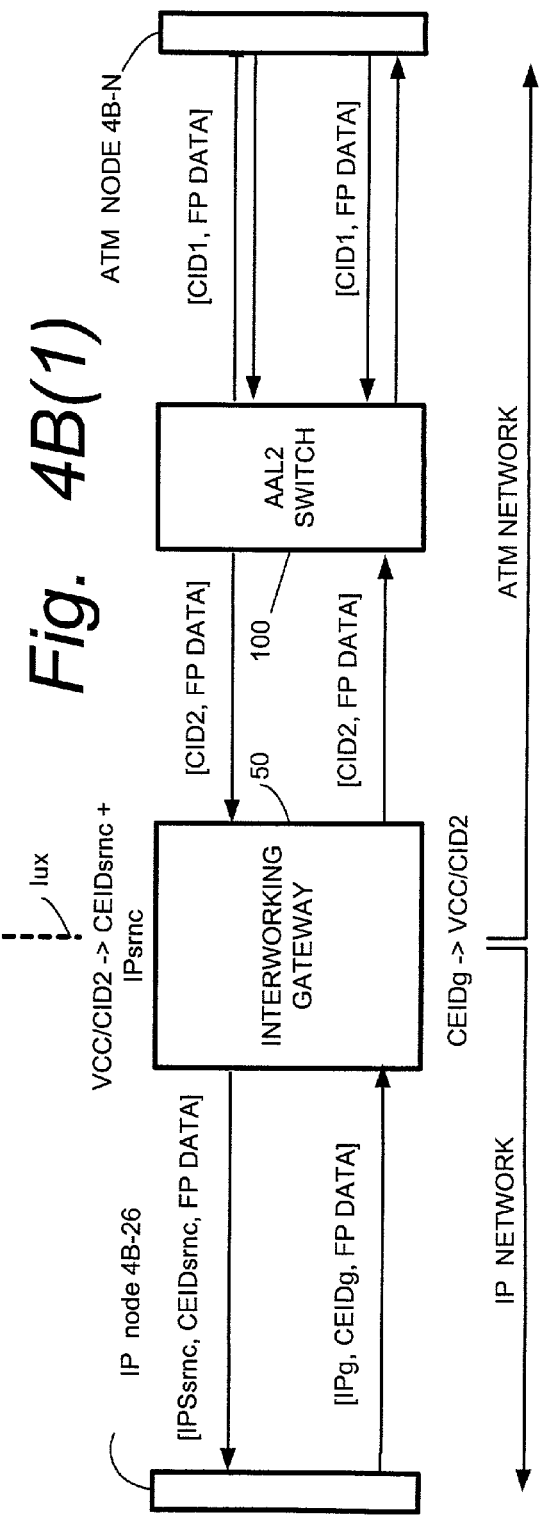

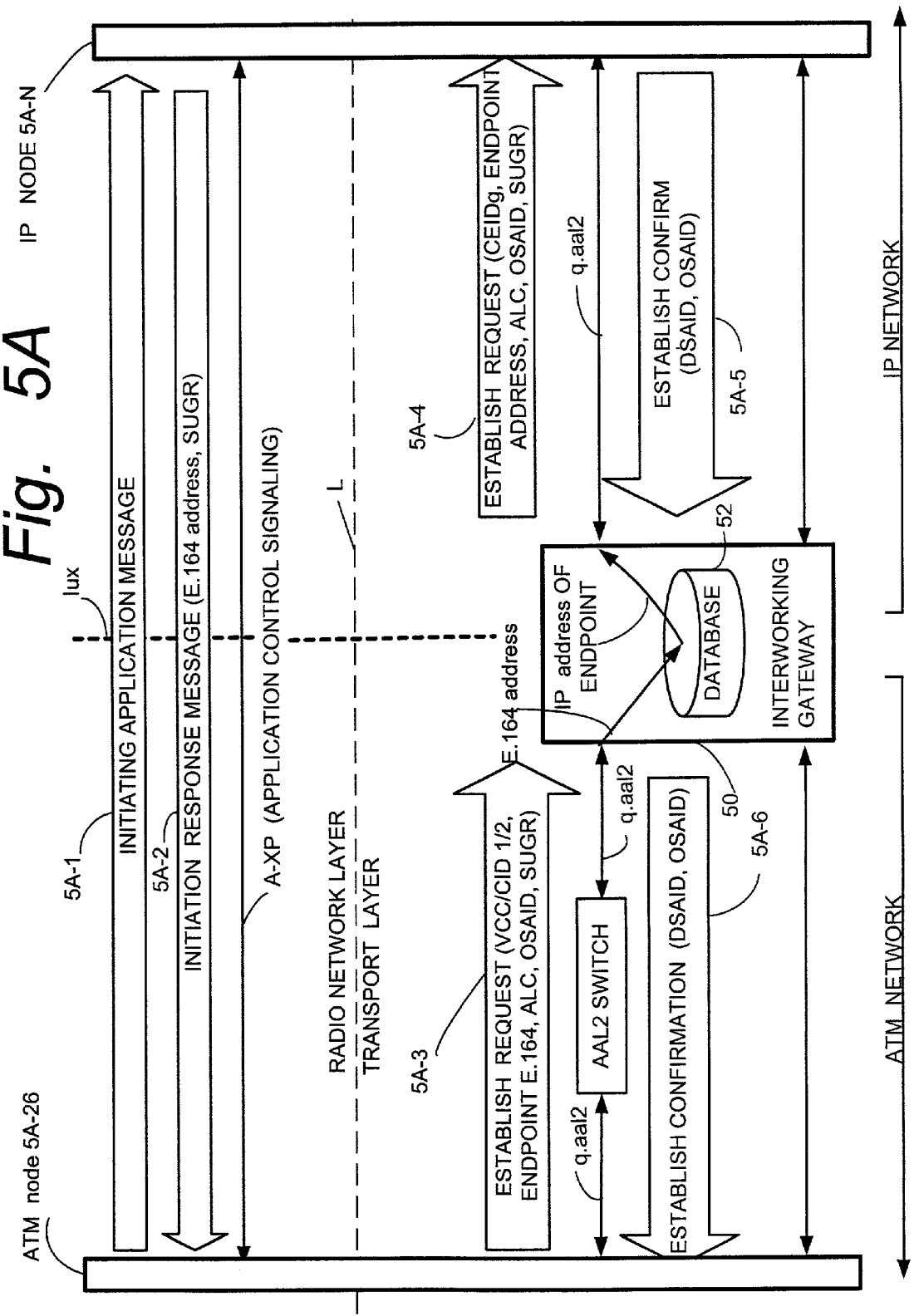

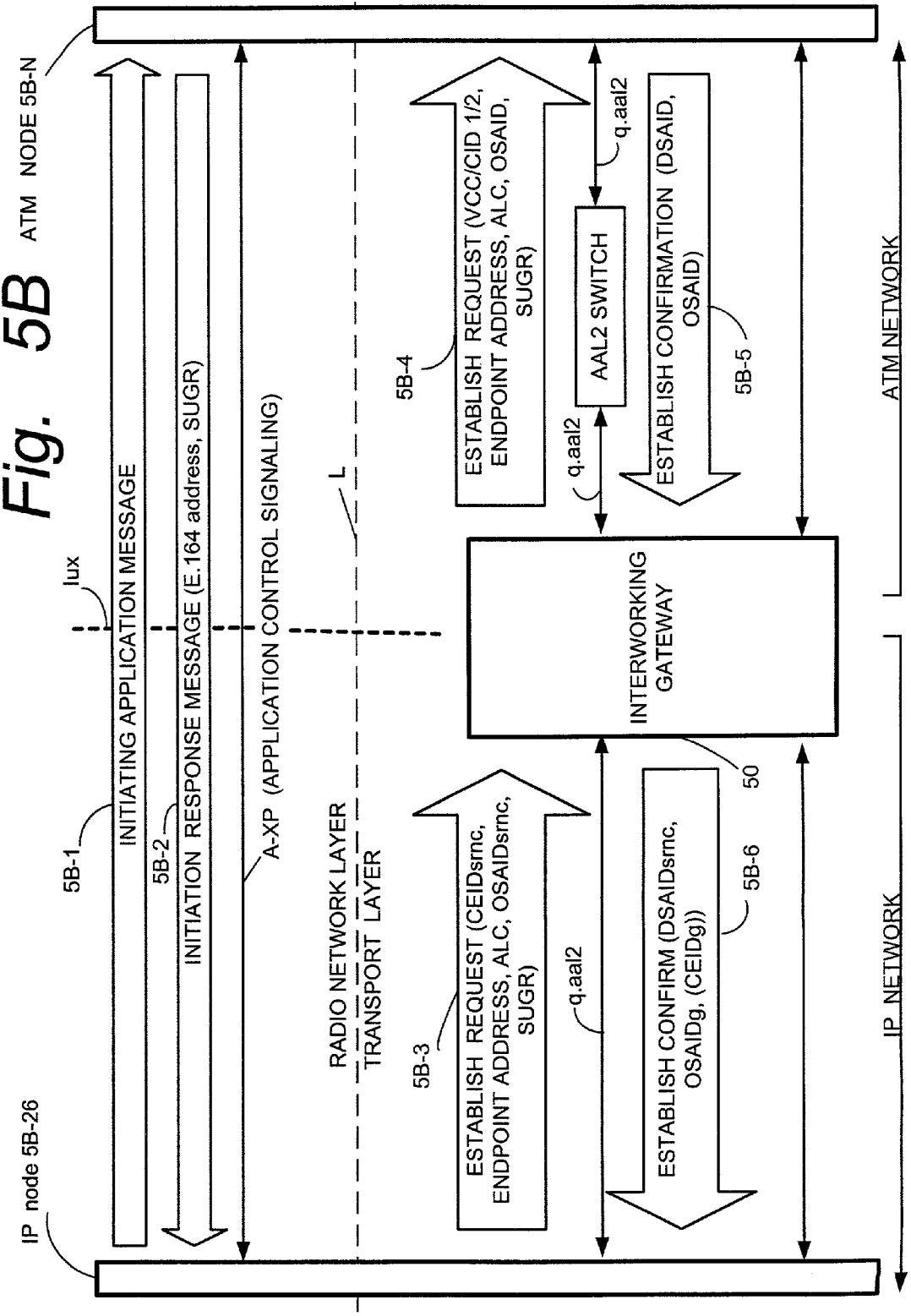

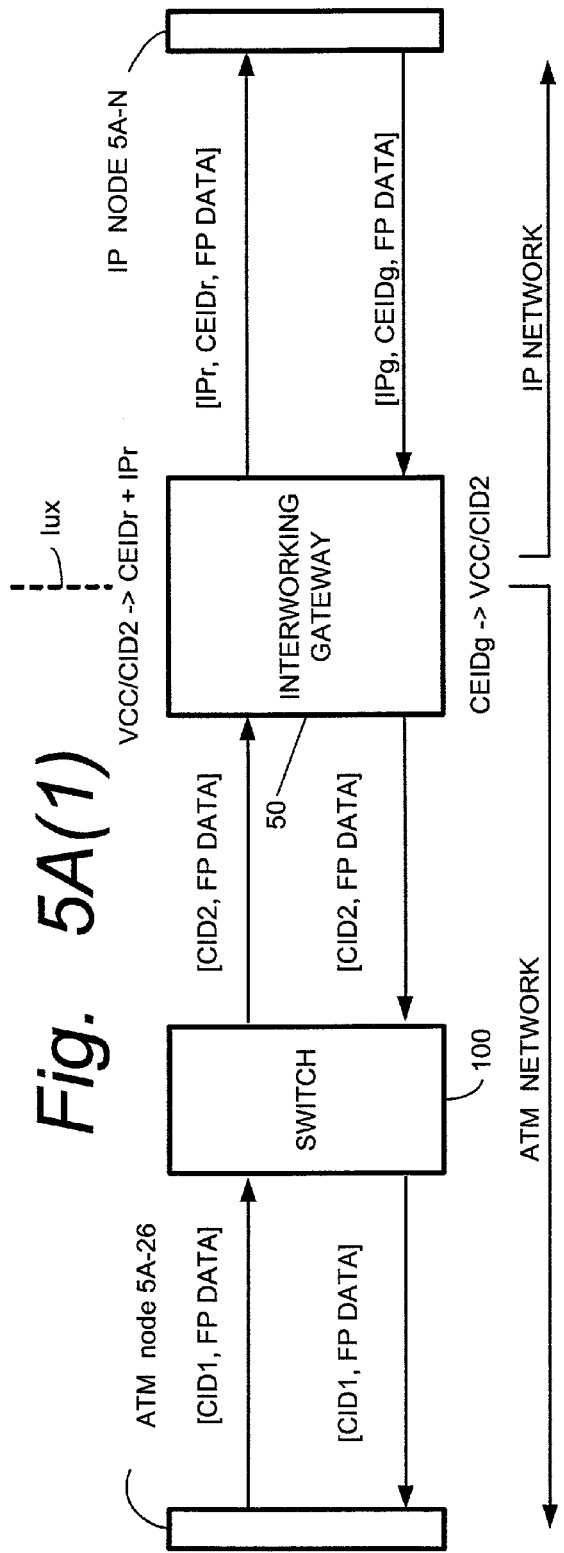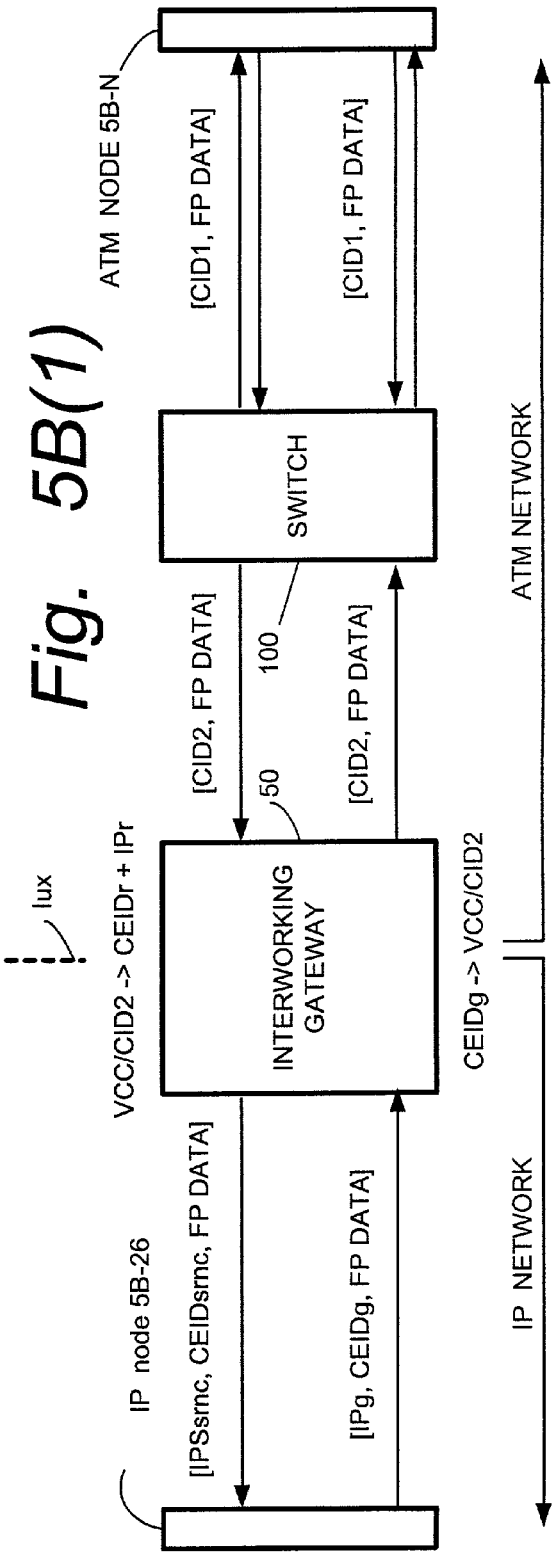

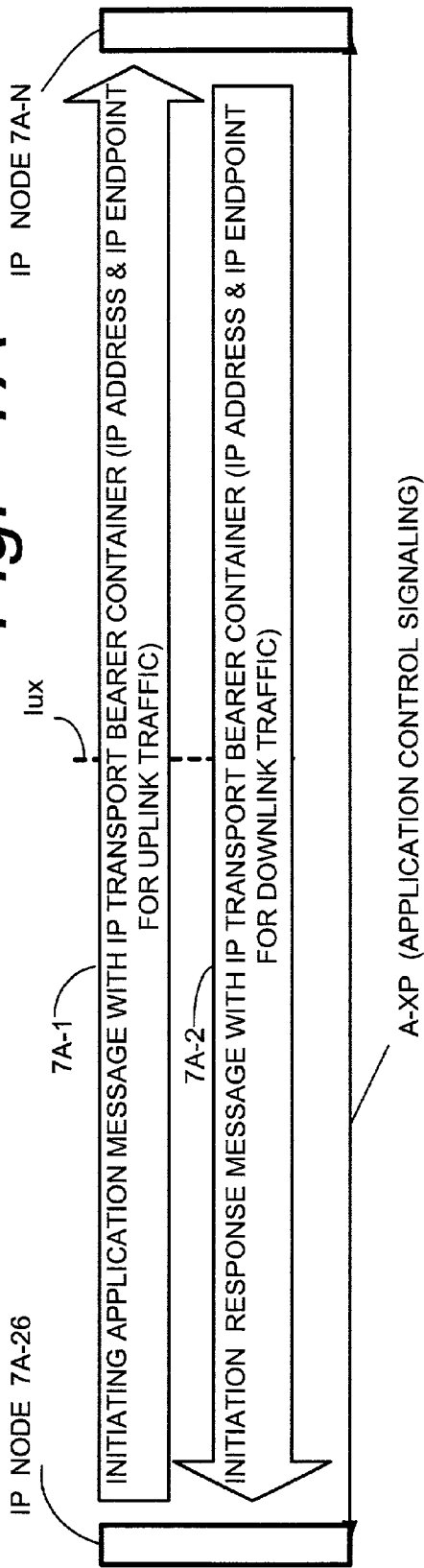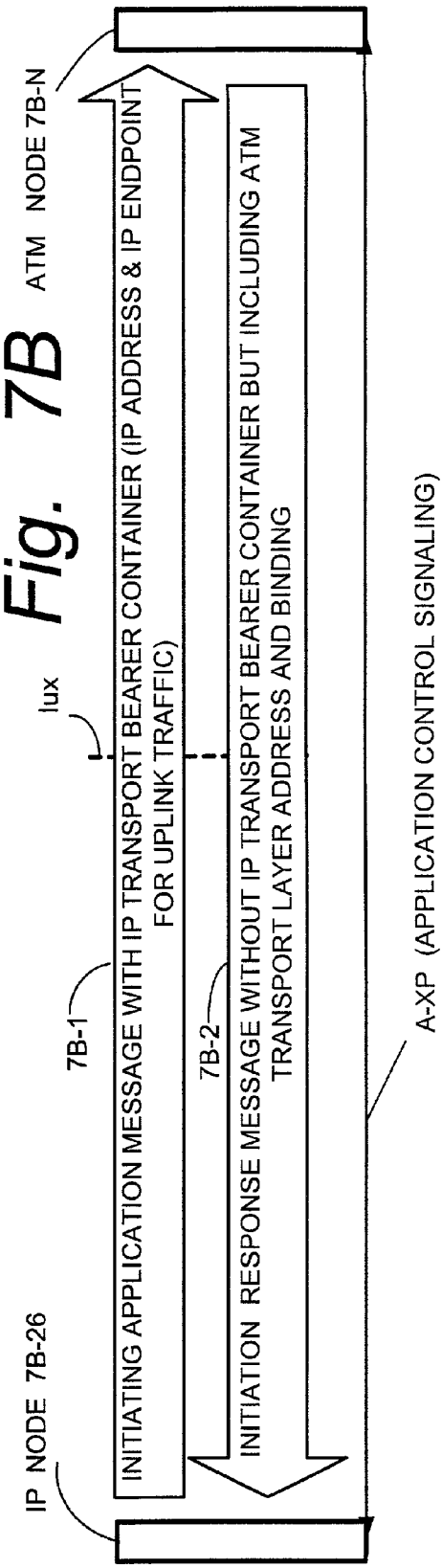

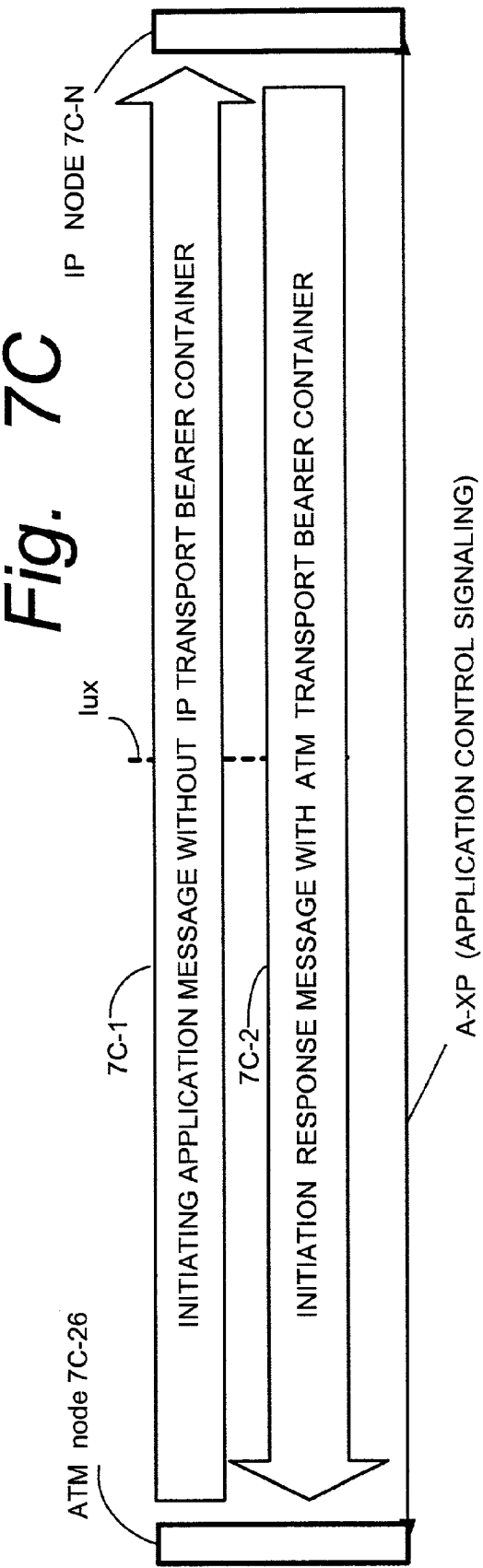

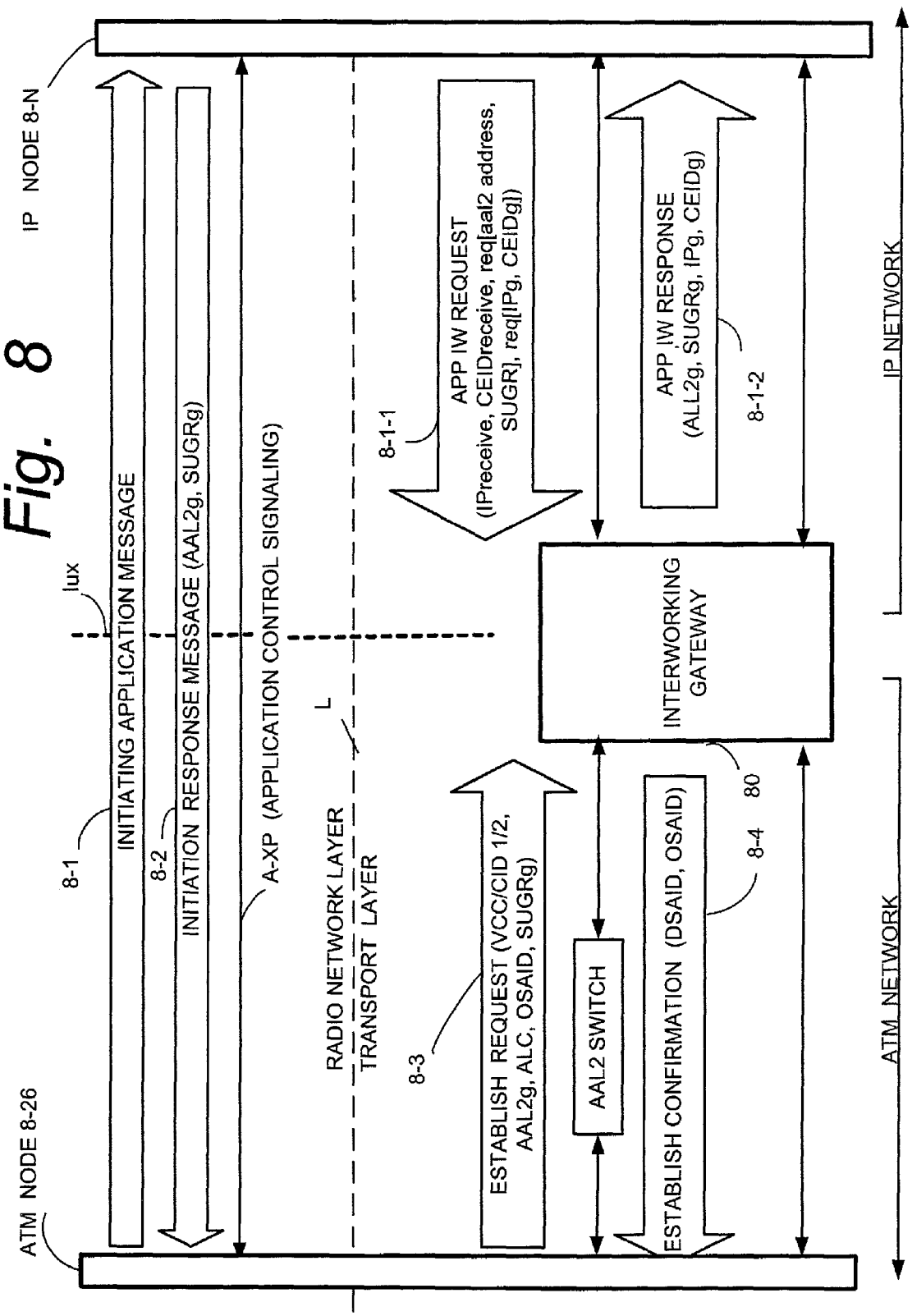

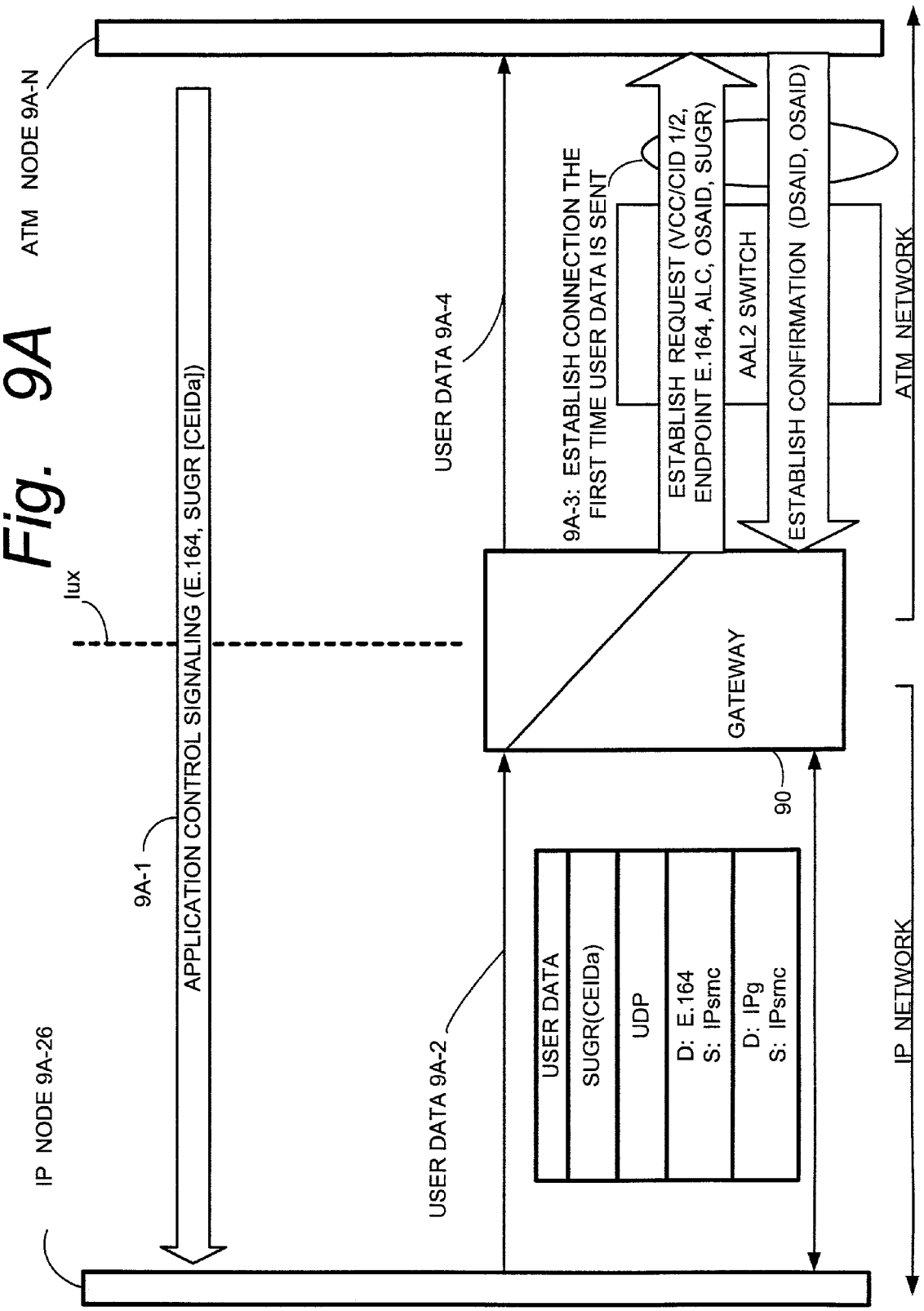

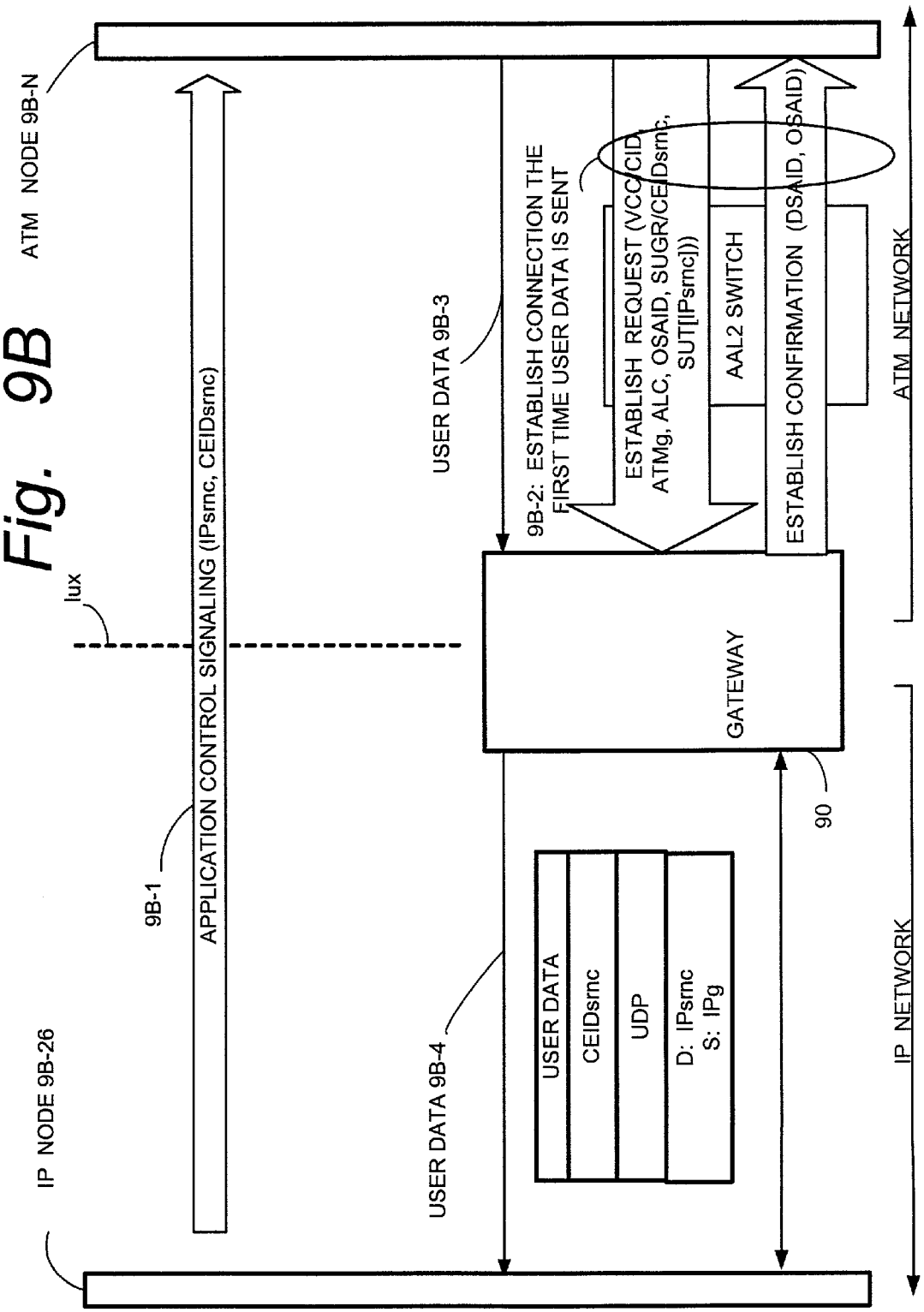

COMBINING DIFFERING TRANSPORT TECHNOLOGIES IN A TELECOMMUNICATIONS SYSTEM

This application claims the priority and benefit of U.S. Provisional Patent Application Ser. No. 60/205,569, filed May 22, 2000, which is incorporated herein by reference. This application is related to U.S. patent application Ser. No. 09/734,040, filed Dec. 12, 2000, which is incorporated herein by reference.

BACKGROUND

1. Field of the Invention

The present invention pertains to telecommunications, and particularly to interworking of differing transport technologies in a telecommunications system.

2. Related Art and other Considerations

In a typical cellular radio system, mobile user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified, typically by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are connected to a core network.

One example of a radio access network is the Universal Mobile Telecommunications (UMTS) Terrestrial Radio Access Network (UTRAN). The UTRAN is a third generation system which is in some respects builds upon the radio access technology known as Global System for Mobile communications (GSM) developed in Europe. UTRAN is essentially a wideband code division multiple access (W-CDMA) system.

As those skilled in the art appreciate, in W-CDMA technology a common frequency band allows simultaneous communication between a user equipment unit (UE) and plural base stations. Signals occupying the common frequency band are discriminated at the receiving station through spread spectrum CDMA waveform properties based on the use of a high speed code, such as a pseudo-noise (PN) code. These high speed PN codes are used to modulate signals transmitted from the base stations and the user equipment units (UEs). Transmitter stations using different PN codes (or a PN code offset in time) produce signals that can be separately demodulated at a receiving station. The high speed PN modulation also allows the receiving station to advantageously generate a received signal from a single transmitting station by combining several distinct propagation paths of the transmitted signal. In CDMA, therefore, a user equipment unit (UE) need not switch frequency when handoff of a connection is made from one cell to another. As a result, a destination cell can support a connection to a user equipment unit (UE) at the same time the origination cell continues to service the connection. Since the user equipment unit (UE) is always communicating through at least one cell during handover, there is no disruption to the call. Hence, the term "soft handover." In contrast to hard handover, soft handover is a "make-before-break" switching operation.

The Universal Mobile Telecommunications (UMTS) Terrestrial Radio Access Network (UTRAN) accommodates both circuit switched and packet switched connections. In this regard, in UTRAN the circuit switched connections involve a radio network controller (RNC) communicating with a mobile switching center (MSC), which in turn is connected to a connection-oriented, external core network, which may be (for example) the Public Switched Telephone Network (PSTN) and/or the Integrated Services Digital Network (ISDN). On the other hand, in UTRAN the packet switched connections involve the radio network controller communicating with a Serving GPRS Support Node (SGSN) which in turn is connected through a backbone network and a Gateway GPRS support node (GGSN) to packet-switched networks (e.g., the Internet, X.25 external networks).

There are several interfaces of interest in the UTRAN. The interface between the radio network controllers (RNCs) and the core network(s) is termed the "Iu" interface. The interface between a radio network controller (RNC) and its base stations (BSs) is termed the "Iub" interface. The interface between the user equipment unit (UE) and the base stations is known as the "air interface" or the "radio interface" or "Uu interface". In some instances, a connection involves both a Serving or Source RNC (SRNC) and a target or drift RNC (DRNC), with the SRNC controlling the connection but with one or more diversity legs of the connection being handling by the DRNC (see, in this regard, U.S. patent application Ser. No. 09/035,821 filed Mar. 6, 1998, entitled "Telecommunications Inter-Exchange Measurement Transfer"; and U.S patent application Ser. No. 09/035,788 filed Mar. 6, 1998, entitled "Telecommunications Inter-Exchange Congestion Control", both of which are incorporated herein by reference). The interface between a SRNC and a DRNC is termed the "Iur" interface.

In the Universal Mobile Telecommunications (UMTS), a service is identified on a non-access stratum level of the UMTS architecture by a Non-Assess Stratum (NAS) Service Identifier (NAS Service ID). On the access stratum level of the UMTS architecture, each service is identified by a radio access bearer (RAB) identifier (RAB ID) on the Iu interface and by one or more radio bearer (RB) identifiers (RB IDs) on the radio interface (e.g., the air interface). Each NAS Service is thus linked to one radio access bearer (RAB), and each radio access bearer (RAB) is linked to one or more radio bearers (RBs). One or more radio bearers (RBs) are linked to one transport channel, e.g., to a common transport channel or to a Dedicated Transport Channel (DCH), on the Iur, Iub, and radio interfaces.

A project known as the Third Generation Partnership Project (3GPP) has undertaken to evolve further the UTRAN and GSM-based radio access network technologies. In a radio access network such as UTRAN as specified by 3GPP R99 standards, there is a need to transport data between nodes of the radio access network. These nodes could be radio network controller (RNC) nodes and base station nodes, for example. For example, the transport of data can be between two radio network controller (RNC) nodes, or between a radio network controller (RNC) node and a base station node.

In general there are two basic categories of data that are transported between nodes of the radio access network. A first type of data is user data, which is generally data that is eventually carried over the radio (air) interface (data that is transmitted to or received from the user equipment unit (UE) over the air interface). A second type of data is control signaling, e.g., signaling for control between the nodes within the radio access network. Normally, the transport of these two types of data is organized as separate transport networks. That is, user data is carried on a user data transport network, while the control signaling is carried on a signaling transport network. There is also control data associated with the user data, such control data being carried on the user data transport network.

For the UMTS R99 standard as specified by the Third Generation Partnership Project (3GPP), AAL2/ATM was selected as the user data transport in the WCDMA radio access network (e.g., the UTRAN). Asynchronous Transfer Mode (ATM) technology (ATM) is a packet-oriented transfer mode which uses asynchronous time division multiplexing techniques. Packets are called cells and have a fixed size. An ATM cell consists of 53 octets, five of which form a header and forty eight of which constitute a "payload" or information portion of the cell. The header of the ATM cell includes two quantities which are used to identify a connection in an ATM network over which the cell is to travel, particularly the VPI (Virtual Path Identifier) and VCI (Virtual Channel Identifier). In general, the virtual path is a principal path defined between two switching nodes of the network; the virtual channel is one specific connection on the respective principal path.

A protocol reference model has been developed for illustrating layering of ATM. The protocol reference model layers include (from lower to higher layers) a physical layer (including both a physical medium sublayer and a transmission convergence sublayer), an ATM layer, and an ATM adaptation layer (AAL), and higher layers. The basic purpose of the AAL layer is to isolate the higher layers from specific characteristics of the ATM layer by mapping the higher-layer protocol data units (PDU) into the information field of the ATM cell and vise versa.

There are several differing AAL types or categories, including AAL0, AAL1, AAL2, AAL3/4, and AAL5. AAL2 is a standard defined by ITU recommendation I.363.2. An AAL2 packet comprises a three octet packet header, as well as a packet payload. The AAL2 packet header includes an eight bit channel identifier (CID), a six bit length indicator (LI), a five bit User-to-User indicator (UUI), and five bits of header error control (HEC). The AAL2 packet payload, which carries user data, can vary from one to forty-five octets.

Although AAL2/ATM was selected as the user data transport in the WCDMA radio access network (e.g., the UTRAN) for the 3GPP R99 standard, the UTRAN architecture is structured to accommodate transport technologies other than ATM. An aspect of the UTRAN which facilitates such accommodation of other transport technologies is the fact that the UTRAN is carefully layered into a radio network layer and a transport layer. In an example shown in FIG. 1, the radio network layer is above line L, while the transport layer is below line L. The radio network layer and the transport layer each have a control plane and a user plane. For the transport of user data, this layering implies that separate frame handling (FP) protocols have been specified as part of the radio network layer (e.g., for the formatting of user data and appending of associated control data). This frame handling (FP) protocol assumes certain services from the transport layer.

FIG. 1 illustrates a first node 1-26 which operates in accordance with the 3GPP R99 standards. Node 1-N is another node which also operates in accordance with the 3GPP R99 standards. The node 1-26 and node 1-N communicate across an Iux interface. In the descriptor "Iux interface", the "x" indicates that the interface is generic and can be, for example, the Iub interface (in which case node 1-N is a base station node), or the Iur interface (in which case node 1-N is another RNC node), or the Iu interface (in which case node 1-N is a core network node). As mentioned above, FIG. 1 does not show the physical layer, which can be a link, preferably bidirectional, between nodes 1-26 and 1-N.

FIG. 1 further shows several types of signaling between node 1-26 and node 1-N. In the control plane of the radio network layer, both node 1-26 and node 1-N execute an "application" which involves application control signaling between node 1-26 and node 1-N. In FIG. 1, the application control signaling is depicted by the line labeled as "A-XP". In the user plane of the radio network layer, user plane traffic occurs as indicated by the line labeled "Iux FP".

In accordance with the 3GPP R99 standard, the establishment of a transport bearer is usually (but not always) initiated by the serving radio network controller (SRNC) as part of the execution of a radio network layer (RNL) procedure. The radio network layer procedure by which the SRNC initiates the transport bearer has four basic steps. As a first step, the node which initiates the (RNL) procedure sends an application message (the application initiating control message) in the control plane of the radio network layer to the other node, initiating the radio network layer procedure. For the Iu interface, the application initiating control message includes an address and a reference (e.g., a binding identification). As a second step, the node receiving the application initiating application message returns an application initiation response message. For establishment of a transport bearer over the Iur and Iub interfaces, the application initiation response message includes an address and a reference (e.g., binding identification) for the receiving node (e.g., UMTS node 1-N in FIG. 1). As a third step, the SRNC sends a transport bearer establishment request message using transport-specific signaling within the transport layer. The Access Link Connection Application Protocol (ALCAP) has been employed by 3GPP as a generic name to indicate the protocol for establishment of transport bearers, e.g., a name for transport layer control plane signaling. For the AAL2/ATM user data transport scheme implemented by 3GPP R99 standards, the ALCAP protocol is Q.2630.1 protocol, also known as q.aal2. The receiving node (e.g., UMTS node 1-N in FIG. 1) receives the transport bearer related information carried in the transport bearer establishment request message and associates the transport bearer with the previous radio network layer procedure using the address and reference (e.g., the address and reference returned in the second above-described message, for example, in the case of the Iur or Iub interfaces). As a fourth step, the receiving node sends back an establish confirm message. The transport bearer is not established until the initiating node receives the establish confirm message. When the transport bearer is established, it is communicated to the higher layers of the UMTS node initiating the RNL procedure (e.g., UMTS node 1-26).

In view of the UTRAN architecture being structured to accommodate transport technologies other than ATM, internet protocol (IP) has been considered as another transport technology. In this regard, some adaptation protocol on top of IP may be required in order to provide services to the frame handling (FP) protocols as are provided by the AAL2 protocol. One example of such an adaptation protocol is the XTP protocol which is disclosed in U.S. patent application Ser. No. 09/734,040, filed Dec. 12, 2000, which is incorporated herein by reference. Such adaptation protocol provides, among other things, both connection identification in endpoints of the IP network and in-sequence delivery. There are two main ways of establishing an IP transport bearer. One way is to include the IP address and IP endpoint identifier in the radio network layer application signaling, and to exchange the IP address and IP endpoint identifier in both directions. The other way is to have separate signaling to exchange this information.

Interworking between AAL2 and internet protocol (IP) has heretofore involved both the control plane of the radio network layer and the transport layer. In this case the application layer signaling is performed in two stages. The first stage involves signaling first to a node that serves as a gateway for the signaling. At the gateway node the application signaling is terminated, and the transport-related information is changed from ATM to IP and vice versa. This transport information is then provided to the transport layer of the transport interworking function. However, for some applications such as the 3GPP UTRAN, this state of the art interworking does not meet the architectural requirement to separate the transport technology from the radio network layer (e.g., application) signaling.

When introducing a new transport technology such as internet protocol (IP), migration aspects of already-implemented networks must be considered. This means, for example, that it must be possible for an operator to operate the network where parts of UTRAN use AAL2/ATM transport, and other parts use internet protocol (IP). Moreover, the new nodes must be able to interwork in a backward compatible way with the old nodes. Given the consideration that all RNC nodes within a radio network such as UTRAN should be able to reach each other, introduction of the new transport technology can be problematic. One possible solution could be to require that all new nodes which connect to the internet protocol (IP) network also connect to the existing AAL2/ATM network to allow reachability over both transport networks. However, such a requirement puts unrealistic constraints on deployment of new nodes.

What is needed, and an object of the present invention, is a technique for interworking differing transport technologies in a multi-layer telecommunications system which includes an application layer and a transport layer.

BRIEF SUMMARY OF THE INVENTION

In a multi-layer telecommunications system which includes an application layer and a transport layer, differing transport technologies are interworked without terminating the application layer signaling or without involving a technology interworking in the control plane of the application layer (e.g., without interworking in the application signaling). In various illustrated embodiments, the application layer is a radio access network (RAN) of a wireless telecommunications system.

In at least some embodiments of the present invention an interworking function is situated on a transport interface between two nodes of the radio access network (UTRAN), or situated on an interface between a node (e.g., RNC node) of the radio access network (UTRAN) and a core network node. The interworking function can be located in a separate node which may be another UMTS node having both ATM and internet protocol (IP) interfaces. There are numerous modes of implementing the interworking of the present invention, regardless of which interface is affected (e.g., an Iur interface, an Iub interface, or an Iu interface).

A first interworking mode involves interworking with q.aal2 signaling. There are various ways or options of implementing the interworking with q.aal2 signaling. A first such example option is to use an IP specific signaling protocol over the IP network. A second example option is to use q.aal2 signaling over the IP network to/from the IP node (e.g., the IP-connected RAN or UMTS node).

In one of its aspects, the present invention also provides an optimization feature in the event that nodes on both side of the interface (Iu interface, Iur interface, or Iub interface) are IP-connected nodes. This optimization feature facilitates determination of whether both nodes are, in fact, IP-connected nodes, and (if so) then permits exchange of IP information in the application signaling message. To make this determination and possible exchange, a first node (being an IP-connected node) includes its IP address and IP endpoint identifier for uplink traffic in an IP transport bearer container sent to the second node in an initiating application control message. If an IP transport bearer container is received from the second node in an application control response message, the transport bearer is considered as being established. Otherwise, if an IP transport bearer container is not received from the second node, the interworking of the present invention is invoked by the first node Another interworking mode involves obtaining address and binding identifier parameters to be included in application signaling messages by consulting a transport layer interworking gateway. In this mode, the first node is not an IP-connected node but the second node is an IP-connected node. Upon receipt of an initiating application message from the first node, the second node obtains from a transport level interworking gateway a network address of the interworking gateway and a binding identifier of the interworking gateway to send back to the first node. Further, the second node establishes a bidirectional IP connection with the interworking gateway. The first node can then use the network address of the interworking gateway and the binding identifier of the interworking gateway to establishes a connection with the interworking gateway.

Yet another mode of implementing interworking for the present invention involves tunneling. Tunneling mechanisms can be used when it is not a requirement that transport connections be established before data is sent and it does not matter which node initiates the AAL2 connection. In tunneling, two independent unidirectional flows on both the IP and AAL2 side are established. For tunneling, the bearer transport information can be included in the application signaling messages.

The present invention also encompasses the potential use of multiple interworking steps. For example, there can be the multiple steps of IP-ATM-IP interworking (e.g., an IP/ATM interworking followed subsequently by an ATM/IP interworking). Alternatively, there can be the multiple steps of ATM-IP-ATM interworking.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 3A and FIG. 3B are diagrammatic views showing an example transport layer interworking technique of the present invention using q.aal2 signaling.

FIG. 4A and FIG. 4B are diagrammatic views showing an option of implementing the interworking technique of FIG. 3A and FIG. 3B using an IP specific signaling protocol over the IP network.

FIG. 4A(1) and FIG. 4B(1) are diagrammatic views showing basic information that is included when user data is sent in the option depicted in FIG. 4A and FIG. 4B, respectively.

FIG. 5A and FIG. 5B are diagrammatic views showing an option of implementing the interworking technique of FIG. 3A and FIG. 3B using q.aal2 signaling over the IP network to/from an IP node.

FIG. 5A(1) and FIG. 5B(1) are diagrammatic views showing basic information that is included when user data is sent in the option depicted in FIG. 5A and FIG. 5B, respectively.

FIG. 7A, FIG. 7B, and FIG. 7C are diagrammatic views illustrating various scenarios of an example optimization feature which facilitates determination of whether both nodes are, in fact, IP-connected nodes, and if so permits exchange of IP information, but which otherwise resorts to interworking.

FIG. 8 is a diagrammatic view showing an example interworking technique of the present invention using interworking with application signaling.

FIG. 9A and FIG. 9B are diagrammatic views showing an example interworking technique of the present invention using tunneling.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 2A:
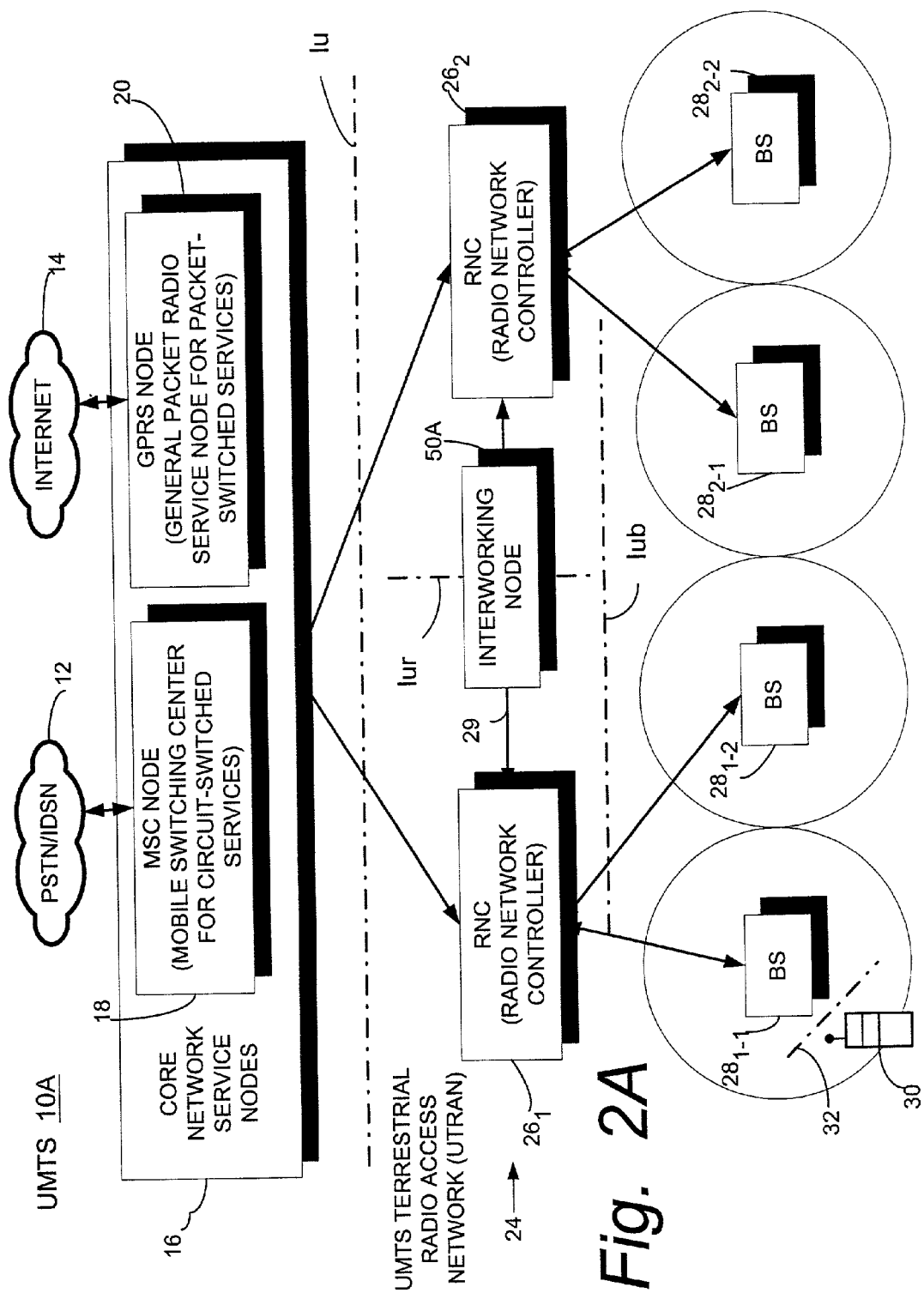
FIG. 2A is diagrammatic view of example mobile communications system showing an example location of an interworking gateway node in accordance with one embodiment of the present invention.
Figure 2B:
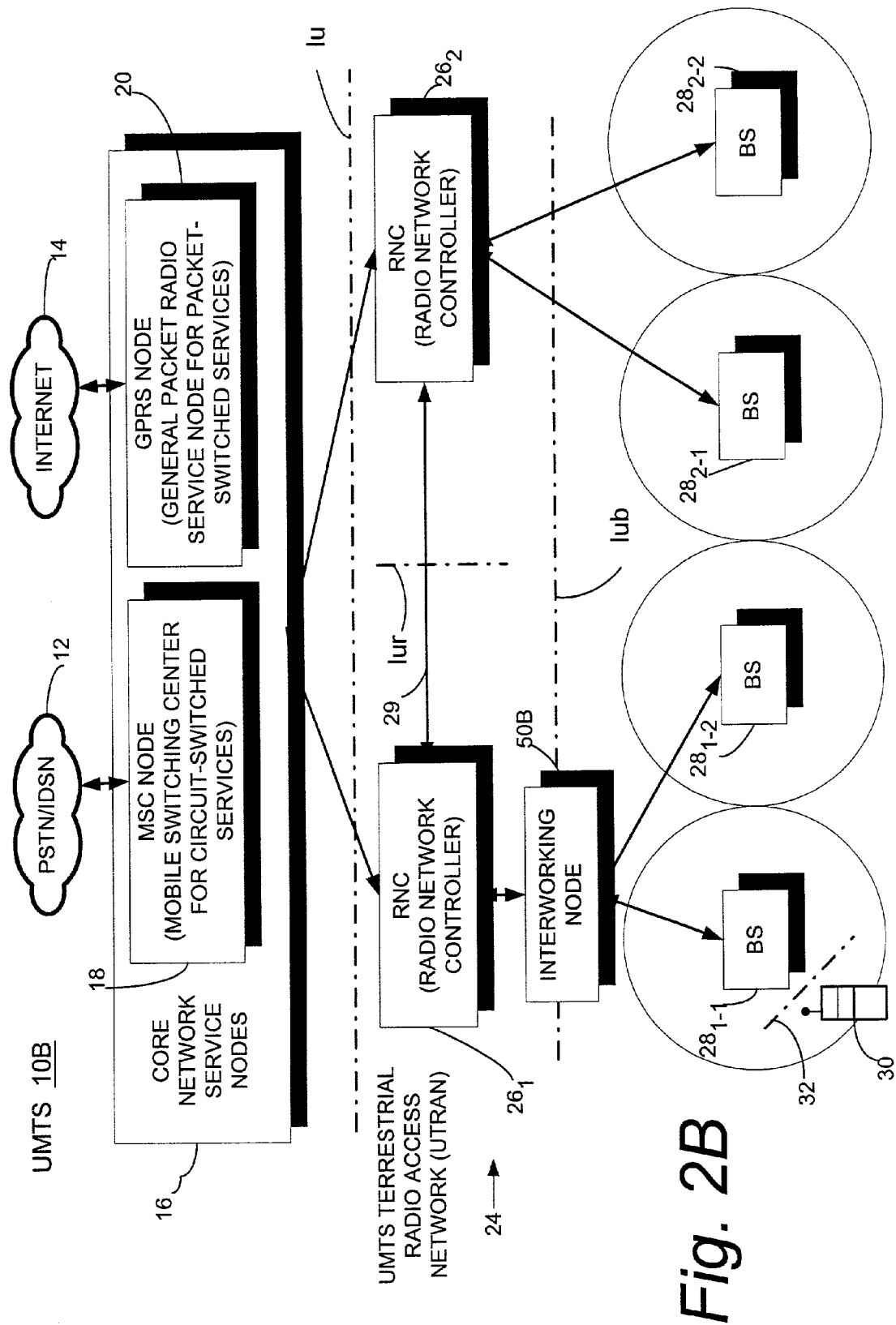
FIG. 2B is diagrammatic view of example mobile communications system showing an example location of an interworking node in accordance with another embodiment of the present invention.
Figure 2C:
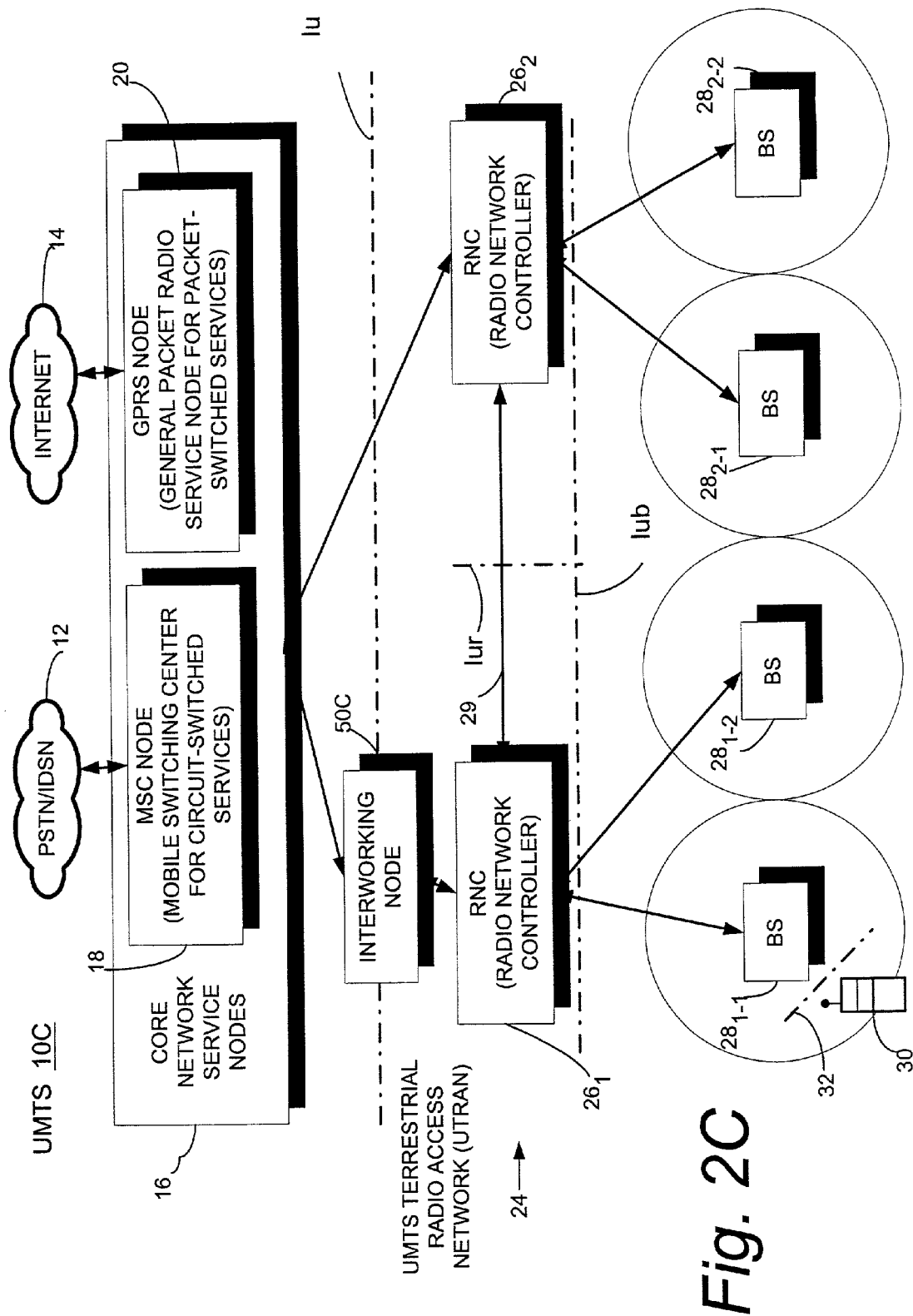
FIG. 2C is diagrammatic view of example mobile communications system showing an example location of an interworking node in accordance with yet another embodiment of the present invention.

The present invention is described in the non-limiting, example context of a universal mobile telecommunications system (UMTS), such as the UMTS 10A shown in FIG. 2A, UMTS 10B shown in FIG. 2B, and UMTS 10C shown in FIG. 2C. The configuration of the UMTS 10A, UMTS 10B, and UMTS 10C are essentially the same, excepting positioning of certain exemplary interworking nodes as hereinafter described.

In each of the UMTS 10A of FIG. 2A, UMTS 10B of FIG. 2B, and UMTS 10C of FIG. 2C, a representative, connection-oriented, external network, shown as a cloud 12 may be for example the Public Switched Telephone Network (PSTN) and/or the Integrated Services Digital Network (ISDN). A representative, connectionless-oriented external network shown as a cloud 14, may be for example the Internet. Both networks are coupled to corresponding service nodes 16. The PSTN/ISDN connection-oriented network 12 is connected to a connection-oriented service node shown as a Mobile Switching Center (MSC) node 18 that provides circuit-switched services. The Internet connectionless-oriented network 14 is connected to a General Packet Radio Service (GPRS) node 20 tailored to provide packet-switched type services which is sometimes referred to as a GPRS service node (GSN).

Each of the core network service nodes 18 and 20 connects to a UMTS Terrestrial Radio Access Network (UTRAN) 24 over a radio access network (RAN) interface referred to as the Iu interface. UTRAN 24 includes one or more radio network controllers (RNCs) 26. For sake of simplicity, the UTRAN 24 of FIG. 2A is shown with only two RNC nodes, particularly RNC $26_1$ and RNC$26_2$. Each RNC 26 is connected to a plurality of base stations (BS) 28. In UTRAN, a base stations (BS) 28 is also called Node B. For example, and again for sake of simplicity, two base station nodes are shown connected to each RNC 26. In this regard, RNC $26_1$ serves base station $28_{1-1}$ and base station $28_{1-2}$, while RNC $26_2$ serves base station $28_{2-1}$ and base station $28_{2-2}$. It will be appreciated that a different number of base stations can be served by each RNC, and that RNCs need not serve the same number of base stations. Moreover, FIG. 2A shows that an RNC can be connected over an Iur interface to one or more other RNCs in the UTRAN 24. An Iur link 29 is shown as connecting the two example radio network controller nodes RNC $26_1$ and RNC$26_2$.

A user equipment unit (UE), such as user equipment unit (UE) 30 shown in FIG. 2A, communicates with one or more base stations (BS) 28 over a radio or air interface 32. Each of the radio interface 32, the Iu interface, the Iub interface, and the Iur interface are shown by dash-dotted lines in FIG. 2A. In this example, radio access is based upon wideband, Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality. Each user mobile station or equipment unit (UE) 30 is assigned its own scrambling code in order for a base station 28 to identify transmissions from that particular user equipment unit (UE) as well as for the user equipment unit (UE) to identify transmissions from the base station intended for that user equipment unit (UE) from all of the other transmissions and noise present in the same area.

Different types of control channels may exist between one of the RNC nodes 26 and user equipment units (UEs) 30. For example, in the forward or downlink direction, there are several types of broadcast channels including a general broadcast channel (BCH), a paging channel (PCH), a common pilot channel (CPICH), and a forward access channel (FACH) for providing various other types of control messages to user equipment units (UEs). In the reverse or uplink direction, a random access channel (RACH) is employed by user equipment units (UEs) whenever access is desired to perform location registration, call origination, page response, and other types of access operations. The random access channel (RACH) is also used for carrying certain user data, e.g., best effort packet data for, e.g., web browser applications. Traffic channels, e.g., either common traffic channels or dedicated traffic channels (DCH), may be allocated to carry substantive call communications with a user equipment unit (UE).

Figure 1:
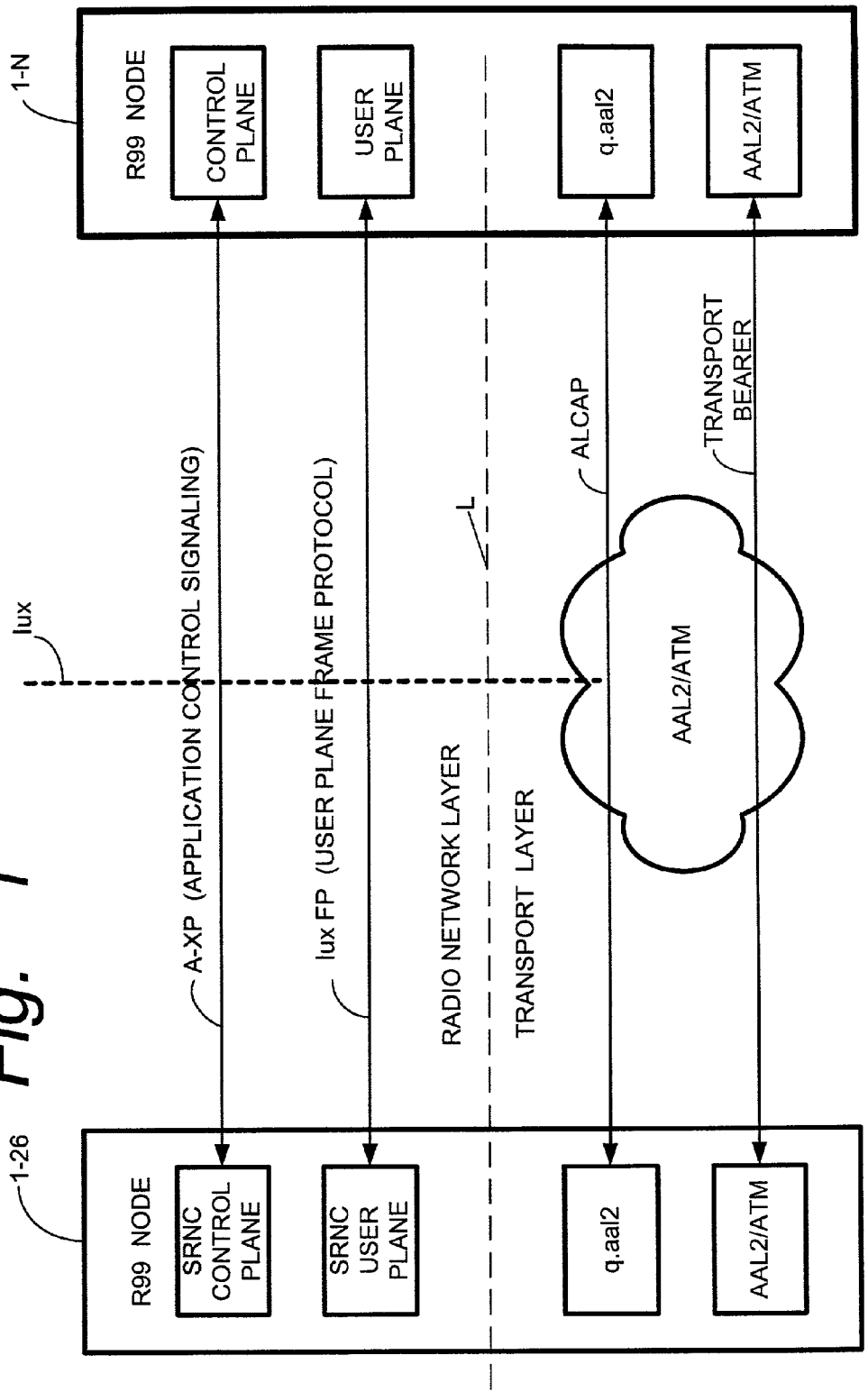
FIG. 1 is a diagrammatic view illustrating, e.g., layering between two nodes of a radio access network.

The present invention involves, among other things, an interworking of differing technologies (e.g., transport layer technologies) without involving a technology interworking in the control plane of the radio access network (e.g., without interworking in the application signaling). As in the case of FIG. 1 previously described, in the present invention there is both an applications layer (e.g., a radio network layer [RNL]) and a transport layer, with the applications layer and the transport layer each having a control plane and a user plane. An "application" is executed in the applications layer; application signaling is executed in the control plane of the applications layer. As part of its execution, the application usually performs a radio network layer (RNL) procedure in order to initiate a transport bearer.

The particular application executed depends, e.g., on which interface is involved. Over the Iu interface, the application signaling protocol is called the Radio Access Network Application Part (RANAP) and the user plane frame protocol is the Iu user plane frame protocol (IuFP). For the Iur interface, the application signaling protocol is known as RNSAP and the user plane frame protocol is the Iur user plane frame protocol (IurFP). For the Iub interface, the application signaling protocol is known as NBAP and the user plane protocol is the Iub user plane frame protocol (IubFP). For call control in the core network, there is an application called Bearer Independent Call Control (BICC). Hereinafter, for convenience (and not by way of limitation) the application layer shall generally be referred to as the radio access network layer.

In accordance with the foregoing objective, in at least some embodiments of the present invention an interworking function is situated on the transport network interface between two nodes of the radio access network (UTRAN). The interworking function can be located in a separate node which may be a UMTS Node having both ATM and internet protocol (IP) interfaces. For example, in an embodiment illustrated in FIG. 2A, interworking gateway node 50A is located between a Serving RNC node (such as radio network controller (RNC) node $26_1$) and another RNC node (such as radio network controller (RNC) node $26_2$). In another embodiment illustrated in FIG. 2B, interworking gateway node 50B is located between a Serving RNC node (such as radio network controller (RNC) node $26_1$) and one or more base station nodes (such as base station $28_{1-1}$, for example). In yet another embodiment illustrated in FIG. 2C, interworking gateway node 50C is located between a core network node (such as MSC node 18, for example) and a Serving RNC node (such as radio network controller (RNC) node $26_1$). Which UTRAN interface requires interworking is determined by the network operator. Since interworking is only done in the transport network layer, the same interworking node can be used regardless of the application (Iu, Iur, Iub) being transported. These embodiments are not meant to be exclusive, as other embodiments are within the ambit of the invention. For example, the scenarios of FIG. 2A and FIG. 2B, could be served by the same interworking gateway node located within the transport network (e.g., at any of the positions/across any of interfaces shown in FIG. 2A, FIG. 2B, or FIG. 2C), depending on the routing table configuration of the transport network.

Although FIG. 2A, 2B, and 2C show the interworking node along the Iur, Iub, and Iu interfaces, respectively, this is just for illustration. The interworking is performed only in the transport layer and is independent of the Iur, Iub, and Iu application protocols. One interworking node could perform the function for all the interfaces.

It now being understood that the interworking node of the present invention can be located either as shown in FIG. 2A, or as in FIG. 2B, or as in FIG. 2C, or even within a node, description of the present invention continues without regard to particular location of the interworking gateway. That is, unless otherwise noted, the ensuing discussion involves either (1) two radio access network nodes [with one of the radio access network nodes being a radio network controller (RNC) node and the other radio access node being either a radio network controller (RNC) node (as in the FIG. 2A embodiment) or a base station node (as in the FIG. 2B embodiment)] or (2) a radio network controller (RNC) node and a core network node (as in the FIG. 2C embodiment). In accordance with this generic description, reference to "interworking function" or "interworking gateway", or any variations thereof, should be understood to represent an interworking gateway such as interworking gateway 50A in the FIG. 2A embodiment, or interworking gateway 50B in the FIG. 2B embodiment, or interworking gateway 50C in the FIG. 2C embodiment, or any other variations thereof (including an embodiment in which the interworking gateway is situated within a radio access network (RAN) node or between an RNC node and a core network node).

There are numerous modes of implementing the interworking of the present invention. A first such mode, which involves interworking with q.aal2 signaling, is generally illustrated in FIG. 3A and FIG. 3B.

Interworking WITH Q.AAL2 Signaling: Overview

Both FIG. 3A and FIG. 3B depict various steps performed and/or messages transmitted in a transport bearer initiating procedure which utilizes the interworking with q.aal2 signaling. In FIG. 3A and FIG. 3B, nodes 3A-26 and 3B-26 are the connection signaling initiators ("the initiating node") and nodes 3A-N and 3B-N are the connection-signaling receivers. In this sense, "connection" refers to a connection provided by the transport layer, what in 3GPP specifications is referred to as "transport bearer". In both FIG. 3A and FIG. 3B, a transport layer interworking gateway 50 is on a path of the connection. In FIG. 3A, node 3A-N (the connection-signaling receiver) is an internet protocol (IP) node, while node 3A-26 (the connection signaling initiator node) is an ATM node.

In the FIG. 3A scenario, connection signaling initiator node 3A-26 initiates the application initiating procedure by sending an initiating application message 3A-1 to the other node (e.g., to node 3A-N). In response, the IP-based node 3A-N returns an initiation response message 3A-2. The initiation response message 3A-2 includes an address for the node 3A-N (e.g., an E.164 address) and a reference (e.g., binding identification) for the receiving node (e.g., node 3A-N). In the illustrated embodiment, the binding identification is preferably a Served User Generated Reference (SUGR). Both the initiating application message 3A-1 and the initiation response message 3A-2 are application signaling messages which, in the illustrated embodiment, can be carried by an SS7 network, or by any other signaling bearer technique. The SS7 is a transport network separate from the user data transport network. The SS7 network can, in turn, be based on pure SS7 (MTP3b) or on SCTP/IP, or a mix thereof.

The transport layer interworking gateway node 50, situated on the path of the connection, is transparent to application control signaling and has nothing to do with the application control signaling. Therefore, transport layer interworking gateway 50 does not affect, and is essentially not affected by, the initiating application message 3A-1 and the initiation response message 3A-2. The transport layer interworking gateway 50 deals only with a certain type of cell flow for the transport layer (e.g., a certain ATM adaptation layer (AAL) type, such as AAL2, for example in the illustrated embodiment) and not the cell flow of the application signaling (e.g., AAL5 in the illustrated embodiment). In general, the application control signaling is transported over a different network than the transport layer network.

Returning to the FIG. 3A scenario, the connection signaling initiator node 3A-26 next sends a q.aal2 Establish Request message 3A-3 on the transport layer. The terminology "q.aal2" is synonymous with Q.2630.1 [described in a publication *New ITU-T Recommendation Q.2630.1 AAL Type 2 Signalling Protocol (Capability Set 1)*] or its successors/revisions (such as Q.2630.2). The q.aal2 Establish Request message 3A-3 is received by transport layer interworking gateway 50. The interworking gateway 50 realizes, that to reach the node having the E.164 address specified in the q.aal2 Establish Request message 3A-3, the outgoing route from interworking gateway 50 is on the internet protocol (IP) network. In this regard, interworking gateway 50 queries a database 52 in order to translate the E.164 address to an IP address of the endpoint node (e.g., Node 3A-N).

Upon obtaining the IP address of the endpoint node, interworking gateway 50 sends an IP bearer signaling message 3A-4 to node 3A-N. The IP bearer signaling message 3A-4 includes information necessary for the node 3A-N to establish a unidirectional connection toward interworking gateway 50. The SUGR is included in the IP bearer signaling message 3A-4 so that node 3A-N, an IP node, can associate this signaling, e.g., IP bearer signaling message 3A-4, with the application signaling (e.g., initiating application message 3A-1). The IP bearer signaling message 3A-4 is in an IP bearer control protocol, generically shown as IP-ALCAP, which can be transported, for example, on Stream Control Transmission Protocol (SCTP) [see IETF RFC 2960].

Upon receiving the IP bearer signaling message 3A-4, node 3A-N responds with IP response message 3A-5 (using, e.g., IP-ALCAP) which includes information necessary to establish a unidirectional connection from interworking gateway 50 to the IP node 3A-N. Receipt of the IP response message 3A-5 at interworking gateway 50 causes interworking gateway 50 to send a q.aal2 Establish confirmation message 3A-6 toward the connection initiating node, e.g., node 3A-26.

The database 52 queried by interworking gateway 50 can be an internal database as shown in FIG. 3A. Alternatively, database 52 can be an external database, such as a Domain Name Server (DNS), for example. See RFC 1034, "Domain Names—Concepts and Facilities"; RFC 1035, "Domain Names—Implementation and Specification"; and, RFC 2181, "Clarifications to the DNS Specification".

In the FIG. 3B scenario, the situation is reversed in that the node 3B-26 is an internet protocol (IP) node, while node 3B-N is an ATM node (e.g., a 3GPP R99 node). As in the FIG. 3A scenario, connection signaling initiator node 3B-26 initiates the application initiating procedure by sending an initiating application message 3B-1 to the other node (e.g., to node 3B-N). In response, the ATM-based node 3B-N returns an initiation response message 3B-2. The initiation response message 3B-2 includes an address for the node 3B-N (e.g., an E.164 address) and SUGR from the receiving node (e.g., node 3B-N).

Upon receiving the initiation response message 3B-2, the IP node 3B-26 realizes that to reach a node such as node 3B-N, SRNC node 3B-26 will have to send a message on the IP network via an appropriate interworking gateway 50. In order to do so, node 3B-26 queries database 54 to translate the E.164 address received for node 3B-N to the IP address of the appropriate interworking gateway 50. Database 54 can either internal or external to node 3B-26. Upon learning of the IP address of the appropriate interworking gateway 50, node 3B-26 sends IP bearer signaling message 3B-3 to that interworking gateway 50. The IP bearer signaling message 3B-3 includes the connection information received from node 3B-N, e.g., the E.164 address of node 3B-N and the SUGR for node 3B-N), as well as the necessary IP connection information for interworking gateway 50 to establish a unidirectional connection to node 3B-26, the connection signaling initiator (e.g., unidirectional IP connection information [IP address, endpoint identifier such as a UDP port number]).

Upon receiving the IP bearer signaling message 3B-3, interworking gateway 50 sends a q.aal2 Establish Request message 3B-4 towards the node 3B-N based on the received E.164 address for node 3B-N. Receipt of the q.aal2 Establish Request message 3B-4 from interworking gateway 50 prompts node 3B-N to issue an q.aal2 Establish Confirmation message 3B-5 toward interworking gateway 50.

When interworking gateway 50 receives the q.aal2 Establish Confirmation message 3B-5 from node 3B-N, interworking gateway 50 sends IP response message 3B-6 to node 3B-26. The IP response message 3B-6 includes the connection information required for the unidirectional connection from node 3B-26 to interworking gateway 50 (e.g., unidirectional IP connection information [IP address, endpoint identifier such as UDP port number]).

There are various ways or options of implementing the interworking with q.aal2 signaling which has generally been depicted in both FIG. 3A and FIG. 3B. A first such option is to use an IP specific signaling protocol over the IP network, as illustrated in FIG. 4A and FIG. 4B. A second example option is to use q.aal2 signaling over the IP network to/from the IP node, as illustrated in FIG. 5A and FIG. 5B. For sake of simplification, FIG. 4A–4B and FIG. 5A–5B show primarily the signaling on the control planes of the radio access network and the transport network without detailing internal functions of the nodes and the interworking gateway. In essence, the options of FIG. 4A and FIG. 4B on one hand, and FIG. 5A and FIG. 5B on the other hand, are subsets of the general implementation already described with reference to FIG. 3A and FIG. 3B, and thus (unless otherwise indicated) are to be construed basically to be consistent with FIG. 3A and FIG. 3B. While the prefix numbers of the messages differ in FIG. 4A, FIG. 4B and FIG. 5A, FIG. 5B from those of the generalized FIG. 3A, and FIG. 3B, respectively, messages bearing similar suffixes serve similar purposes. Moreover, it will be appreciated that, although the user planes are present in the implementation, labels for the user planes have been omitted from some of the illustrations.

Interworking WITH Q.AAL2 Signaling: Option of USING an IP Specific Signaling Protocol Over the IP Network FIG. 4A and FIG. 4B show certain basic events which occur with the option of using an IP specific signaling protocol over the IP network to implement the interworking with q.aal2 signaling. In this option, an IP specific signaling protocol is used over the IP network. The present invention is not limited to utilization of any particular IP protocol, as any IP protocol can be utilized so long as it is consistent with any capable of conveying the information required (as hereinafter explained). IP specific signaling protocols which can be utilized with the present invention include both SIP and H.245. SIP is Session Initiation Protocol, see IETF RFC 2543. For H.245, see ITU-T Recommendation H.245, *Control Protocol for Multimedia Communication*. The IP protocol used with the invention can be an conventional existing protocol, or a new lightweight IP specific signaling protocol.

The information that must be conveyed by the IP specific signaling protocol for implementation of the IP signaling option of the present invention includes the following:

(1) unidirectional IP connection information (IP address, endpoint identifier such as a UDP port number);
(2) destination address for the AAL2 network, e.g., E.164 address, and SUGR;
(3) potential bandwidth and QoS information for the interworking gateway to be able to set up the AAL2 connection with appropriate attributes and on an appropriate VCC.

As in like manner with FIG. 3A and FIG. 3B, in FIG. 4A and FIG. 4B nodes 4A-26 and 4B-26 are the connection signaling initiators ("the initiating node") and nodes 4A-N and 4B-N are the connection-signaling receivers. FIG. 4A illustrates the situation in which connection signaling initiator node 4A-26 is an ATM node and Node 4A-N is an IP node. Conversely, FIG. 4B illustrates the situation in which connection signaling initiator node 4B-26 is an IP node and node 4B-N is an ATM node.

As in the generalized FIG. 3A scenario of which it is an implementation subset, in the FIG. 4A scenario the ATM connection signaling initiator node 4A-26 initiates the application initiating procedure by sending an initiating application message 4A-1 to the other node (e.g., to node 4A-N). In response, the IP-based node 4B-N returns an initiation response message 4A-2. The initiation response message 4A-2 includes an address for the node 4B-N (e.g., an E.164 address) and a SUGR value as a binding identification.

FIG. 4A shows connection signaling initiator node 4A-26 next sending a q.aal2 Establish Request message 4A-3 on the transport layer to interworking gateway 50, possibly via an AAL2 switch. As shown in FIG. 4A, the Establish Request message 4A-3 includes the following information elements: (1) the VCC/CID to interworking gateway 50; (2) the E.164 address of the endpoint node (i.e., node 4A-N in this scenario); (3) ALC [AAL Type 2 Link Characteristics]; (4) OSAID; (5) the SUGR of the endpoint node (node 4A-N), as well as other relevant elements of future capability sets of Q.2630, e.g., for quality of service (QoS) management.

In like manner as in the FIG. 3A scenario, in the FIG. 4A scenario interworking gateway 50 queries a database 52 in order to translate the AAL2 network address, e.g., the E.164 address, to an IP address of the endpoint node (e.g., node 4A-N). Upon obtaining the IP address of the endpoint node, interworking gateway 50 sends an IP bearer signaling message to node 4A-N. The message 4A-4 is labeled as Request message 4A-4 in FIG. 4A. The Request message 4A-4 includes the IP address of interworking gateway 50 (Ipg); an identifier for the connection as afforded by interworking gateway 50 (CEIDg); and the SUGR of the endpoint node (e.g., node 4A-N).

Upon receipt of the Request message 4A-4, the IP endpoint or receiving node (node 4A-N) returns an IP response message 4A-5 corresponding to message 3A-5 of FIG. 3A. This IP response message includes information necessary to establish a unidirectional connection from interworking gateway 50 to the IP node 4A-N. The Response message 4A-5 includes the IP address IPr of the endpoint node (e.g., receiving node 4A-N) and an identifier for the connection as afforded by the endpoint node (CEIDr). Receipt of the Response message 4A-5 at interworking gateway 50 causes interworking gateway 50 to send a q.aal2 Establish confirmation message 4A-6 toward the connection initiating node, e.g., node 4A-26. The Establish confirmation message 4A-6 includes both the information elements DSAID and OSAID.

Information element DSAID is a Destination Signaling Association Identifier; information element OSAID is an Originating Signaling Association Identifier. The DSAID and OSAID are employed in q.aal2 signaling. During connection setup signaling, DSAIDs/OSAIDs are selected by each node and communicated to the adjacent node as a reference to that connection in the control plane. When a connection is to be released, a release message is sent with these signaling identifiers so that the nodes know which connection should be released.

For the FIG. 4A scenario, FIG. 4A(1) shows basic information that is included when frame protocol (FP) data is sent. When frame protocol data is sent on the IP network, the destination IP address, connection identifier, and frame protocol data are transmitted. FIG. 4A(1) also shows presence of a switch 100 between ATM node 4A-26 and interworking gateway 50, and the information carried by the link between ATM node 4A-26 and the switch 100 on the one hand, and the information carried by the link switch 100 and interworking gateway 50 on the other hand. In FIG. 4A(1), IPr refers to the IP address of the receiving node (e.g., node 4A-N), and CEIDr similarly refers to the connection identifier of the receiving node. Conversely, IPg refers to the IP address of interworking gateway 50 and CEIDg similarly refers to the connection identifier of interworking gateway 50. The IP addresses shown are contained in the destination IP address field of the corresponding IP headers.

In the FIG. 4B scenario, the situation is reversed (as in FIG. 3B) in that the node 4B-26 is an internet protocol (IP) node, while node 4B-N is an ATM node (e.g., a 3GPP R99 node). Connection signaling initiator IP node 4B-26 initiates the application initiating procedure by sending an initiating application message 4B-1 to the other node (e.g., to node 4B-N). In response, the ATM-based node 4B-N returns an initiation response message 4B-2. The initiation response message 4B-2 includes an address for the node 4B-N (e.g., an E.164 address) and SUGR from the receiving node (e.g., node 4B-N). As in FIG. 3B, database 54 is queried to translate the E.164 address received for node 4B-N to the IP address of the appropriate interworking gateway 50. Upon learning of the IP address of the appropriate interworking gateway 50, SRNC node 4B-26 sends an IP bearer signaling message to that interworking gateway 50.

In the FIG. 4B option, the IP bearer signaling message is labeled as Request message 4B-3. The Request message 4B-3 includes the IP address of the connection initiating node (e.g., SRNC node 4B-26); an identifier for the connection as afforded by the connection initiating node (CEIDsrnc); the address of the endpoint node (e.g., node 4B-N), and the SUGR of the endpoint node. Thus, in the FIG. 4B option, parameters needed for the gateway 50 to generate a q.aal2 message are included in Request message 4B-3.

Upon receiving the IP bearer signaling message in the form of Request message 4B-3, interworking gateway 50 sends an Establish Request message 4B-4 towards the node 4B-N. The Establish Request message 4B-4 is a q.aal2 message which includes the following information elements: (1) the VCC/CID to interworking gateway 50; (2) the address of the endpoint node (i.e., node 4B-N in this scenario); (3) ALC; (4) OSAID; and (5) the SUGR of the endpoint node (node 4B-N).

Receipt of the q.aal2 Establish Request message 4B-4 from interworking gateway 50 prompts node 4B-N to issue an q.aal2 Establish Confirmation message 4B-5 toward interworking gateway 50. The Establish confirmation message 4B-5 includes both the information elements DSAID and OSAID. When interworking gateway 50 receives the q.aal2 Establish Confirmation message 4B-5 from node 4B-N, interworking gateway 50 sends an IP response message to SRNC node 4B-26. The IP response message is labeled as Response message 4B-6 in FIG. 4B. The Response message 4B-6 includes the IP address of interworking gateway 50 and an identifier for the connection as afforded by interworking gateway 50 (CEIDgateway).

For the FIG. 4B scenario, FIG. 4B(1) shows basic information that is included when frame protocol data is sent. Again, as in FIG. 4A(1), when frame protocol data is sent over the IP network, the destination IP address, connection identifier, and frame protocol data are transmitted. Like FIG. 4A(1), FIG. 4B(1) also shows presence of a switch 100, this time between between ATM node 4B-N and interworking gateway 50. In FIG. 4B(1), IPsrnc refers to the IP address of the connection initiator node (e.g., node 4B-26), and CEIDsmc similarly refers to the connection identifier of the connection initiator node. As previously understood, IPg refers to the IP address of interworking gateway 50 and CEIDg similarly refers to the connection identifier of interworking gateway 50. The IP addresses shown are contained in the destination IP address field of the corresponding IP headers.

Interworking WITH Q.AAL2 Signaling: Option of USING Q.AAL2 Signaling Over the IP Network FIG. 5A and FIG. 5B show certain basic events which occur with the option of using q.aal signaling over the IP network to and from the IP node to implement the interworking. In the particular example illustration shown in FIG. 5A and FIG. 5B, SCTP is used for transporting the signaling over the IP network.

As in like manner with FIG. 3A and FIG. 3B, in FIG. 5A and FIG. 5B nodes 5A-26 and 5B-26 are the connection signaling initiators ("the initiating node") and nodes 5A-N and 5B-N are the connection-signaling receivers. FIG. 5A illustrates the situation in which connection signaling initiator node 5A-26 is an ATM node and node 5A-N is an IP node. Conversely, FIG. 5B illustrates the situation in which connection signaling initiator node 5B-26 is an IP node and node 5B-N is an ATM node.

As in the generalized FIG. 3A scenario of which it is an implementation subset, in the FIG. 5A scenario the ATM connection signaling initiator node 5A-26 initiates the application initiating procedure by sending an initiating application message 5A-1 to the other node (e.g., to node 5A-N). In response, the IP-based node 5A-N returns an initiation response message 5A-2. The initiation response message 5A-2 includes an address for the node 5A-N (e.g., an E.164 address) and a SUGR value as a binding identification. The connection endpoint ID (CEID) of node 5A-N can be used as the SUGR in the q.aal2 messages. In other words, in the initiation response message 5A-2 the IP-based node 5A-N has sent its address and SUGR to SRNC node 5A-26 in RNSAP.

FIG. 5A shows connection signaling initiator node 5A-26 next sending a q.aal2 Establish Request message 5A-3 on the transport layer toward the endpoint node (e.g., node 5A-N). The Establish Request message 5A-3 includes the following information elements: (1) the VCC/CID to interworking gateway 50; (2) the E.164 address of the endpoint node (i.e., node 5A-N in this scenario); (3) ALC; (4) OSAID; (5) the SUGR of the endpoint node (node 5A-N). The interworking gateway 50 is in the path toward the endpoint node 5A-N. When interworking gateway 50 receives the Establish Request message 5A-3 from the SRNC ATM node 5A-26, interworking gateway 50 queries a database to translate the E.164 address to an IP address of the endpoint node (e.g., node 5A-N).

Upon obtaining the IP address of the endpoint node, interworking gateway 50 chooses a source IP address to be used for receiving q.aal2 signaling and user data. Interworking gateway 50 sends an IP bearer signaling message toward node 5A-N using IP transport (e.g,. based on the IETF SCTP standard [a standard way of sending SS7-based messages over IP networks]). The chosen source IP address is used in the Source IP address field of the IP header. The destination IP address in the IP header is an address associated with the endpoint address. In accordance with the option of implementation depicted by FIG. 5A, the message is labeled as Establish Request message 5A-4. The Establish Request message 5A-4 includes an identifier for the connection as afforded by interworking gateway 50 (CEIDg); the address of the endpoint node (e.g., node 5A-N); the ALC, the OSAID, and the SUGR of the endpoint node. The interworking gateway 50 can include its connection endpoint identifier (CEIDg) field in the q.aal2 Establish Request message 5A-4. The CEID to be used for data toward interworking gateway 50 (CEIDg) is thus included in the connection element identifier field (which normally carries the VCC/CID for AAL2).

Upon receipt of the q.aal2 Establish Request message 5A-4 at node 5A-N, the IP address of interworking gateway 50 can be ascertained from the source address of the IP header of the q.aal2 Establish Request message 5A-4. The IP endpoint node (node 5A-N) returns an Establish Confirmation message 5A-5 toward the interworking gateway 50. The Establish Confirmation message 5A-5 basically corresponds to IP response message 3A-5 of FIG. 3A. This Establish Confirmation message 5A-5 includes the DSAID and OSAID. Receipt of the Establish Confirmation message 5A-5 at interworking gateway 50 causes interworking gateway 50 to send an Establish Confirmation message 5A-6 toward the connection initiating node, e.g., node 5A-26. The Establish confirmation message 5A-6 also includes the information elements DSAID and OSAID.

In the FIG. 5A scenario, the IP node 5A-N uses the source IP address in the Establish Request message 5A-4 for user data (e.g., frame protocol data [FP]) toward interworking gateway 50, and uses the CEIDg as the connection identifier in this direction (e.g., toward interworking gateway 50). For user data toward the endpoint node (e.g., node 5A-N), interworking gateway 50 uses the IP address corresponding to the end point address, and uses the CEID of the endpoint node for the connection identifier that was provided in the SUGR parameter.

In the FIG. 5B scenario, the situation is reversed (as in FIG. 3B) in that the SRNC node 5B-26 is an internet protocol (IP) node, while node 5B-N is an ATM node (e.g., a 3GPP R99 node). Connection signaling initiator IP node 5B-26 initiates the application initiating procedure by sending an initiating application message 5B-1 to the other node (e.g., to node 5B-N). In response, the ATM-based node 5B-N returns an initiation response message 5B-2. The initiation response message 5B-2 includes an address for the node 5B-N (e.g., an E.164 address) and SUGR from the receiving node (e.g., node 5B-N).

The IP SRNC node 5B-26 chooses a source IP address to be used for receiving q.aal2 signaling and the user data. As in FIG. 3B, it queries a database to translate the E.164 address received for node 5B-N to the IP address of the appropriate interworking gateway 50. Upon learning of the IP address of the appropriate interworking gateway 50, SRNC node 5B-26 sends an Establish Request message 5B-3 to that interworking gateway 50. The Establish Request message 5B-3 can be transported using IETF SCTP protocol over the IP network. The chosen source IP address is used in the Source IP address field of the IP header. The destination IP address in the IP header is an address associated with the endpoint address received in the initiation response message. The Establish Request message 5B-3 of FIG. 5B includes an identifier for the connection as afforded by the connection initiating node (CEIDsrnc); the address of the endpoint node (e.g., node 5B-N); ALC; OSAID of the connection initiating node; and the SUGR of the endpoint node.

The SRNC node 5B-26 needs to know the IP address of interworking gateway 50. Such knowledge can be acquired in various ways, such as (for example) preconfiguration of a mapping to the IP address for the appropriate gateway based on the address received from the receiver node (e.g., node 5B-N). The ATM q.aal2 signaling does a similar thing when it determines where to send a q.aal2 message.

Upon receiving the Establish Request message 5B-3, interworking gateway 50 sends an Establish Request message 5B-4 towards the node 5B-N. The Establish Request message 5B-4 includes the following information elements: (1) the VCC/CID to the endpoint node (i.e., node 5B-N); (2) the address of node 5B-N; (3) ALC; (4) OSAID; and (5) the SUGR of the endpoint node (node 5B-N). Thus, interworking gateway 50 sends the Establish Request message 5B-4 toward the ATM-based node 5B-N based on the E.164 address and SUGR received from the IP SRNC node SB-26 to establish an ATM connection.

Receipt of the q.aal2 Establish Request message 5B-4 from interworking gateway 50 prompts node 5B-N to issue an Establish Confirmation message 5B-5 toward interworking gateway 50. The Establish confirmation message 5B-5 includes both the information elements DSAID and OSAID. When interworking gateway 50 receives the Establish Confirmation message 5B-5 from node 5B-N, interworking gateway 50 sends an Establish Confirmation message 5B-6 to SRNC node 5B-26. The Establish Confirmation message 5B-6 includes the DSAID of SRNC node 5B-26 (received in the OSAID parameter of the Establish Request message); and the OSAID of interworking gateway 50. The OSAID parameter in this message is also used as the Connection Endpoint Identifier for user plane traffic from the IP node 5B-26 to the interworking gateway 50.

The Establish Confirmation message 5B-6 is sent to the IP address received as the IP source address in the Establish Request message 4B-4. The OSAID in the Establish Confirm message 5B-6 is used for the user plane connection identifier for user data from the IP SRNC node 5B-26 to interworking gateway 50. The IP SRNC node 5B-26 uses the source IP address in the Establish Confirmation message 5B-6 as the destination address for user data toward interworking gateway 50, and uses the OSAID of interworking gateway 50 for the connection identifier (CEIDg) of interworking gateway 50. It is possible that the source IP address in the Establish Confirmation message 5B-6 is not the same address that the Establish Request message used for a destination address. In the Establish Confirm message, the DSAID of the SRNC 5B-26 and the destination address will uniquely bind the Establish Request and Establish Confirm messages in the IP SRNC 5B-26.

For the FIG. 5A scenario, FIG. 5A(1) shows basic information that is included when frame protocol data [FP] (e.g., user data) is sent. The IP addresses shown (IPr and IPg) are contained in the IP destination address fields in the IP header. CEIDr is the SUGR that was used in the connection setup. IPr corresponds to the IP address resulting from the mapping from the E.164 endpoint address. Similarly, for the FIG. 5B scenario, FIG. 5B(1) shows basic information that is included when frame protocol data is sent. The IP addresses shown (IPsmc and IPg) are contained in the IP destination address fields in the IP header. FIG. 5A(1) and FIG. 5B(1) basically correspond to the earlier described traffic flows of FIG. 4A(1) and FIG. 4B(1), respectively.

Figure 6B:
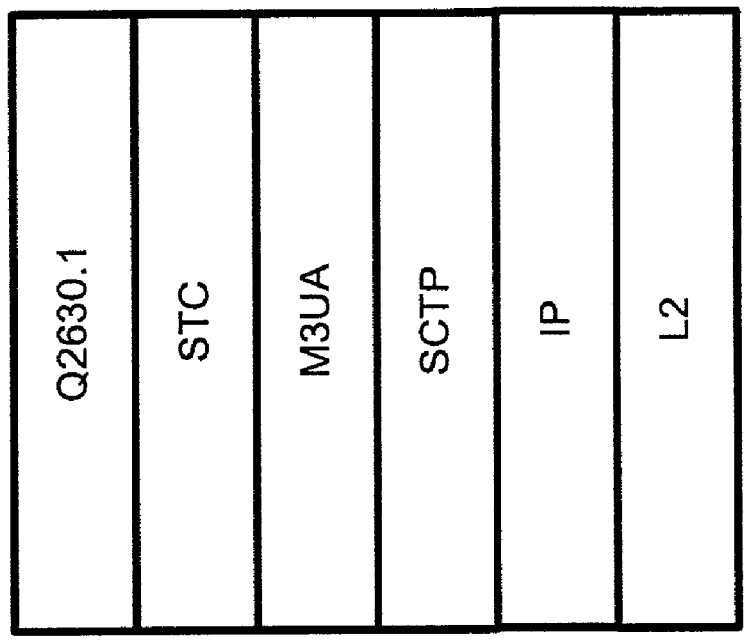
FIG. 6A and FIG. 6B are diagrammatic views showing protocol layers on the ATM network and IP network, respectively, for the option of FIG. 5A and FIG. 5B option.
Figure 6A:
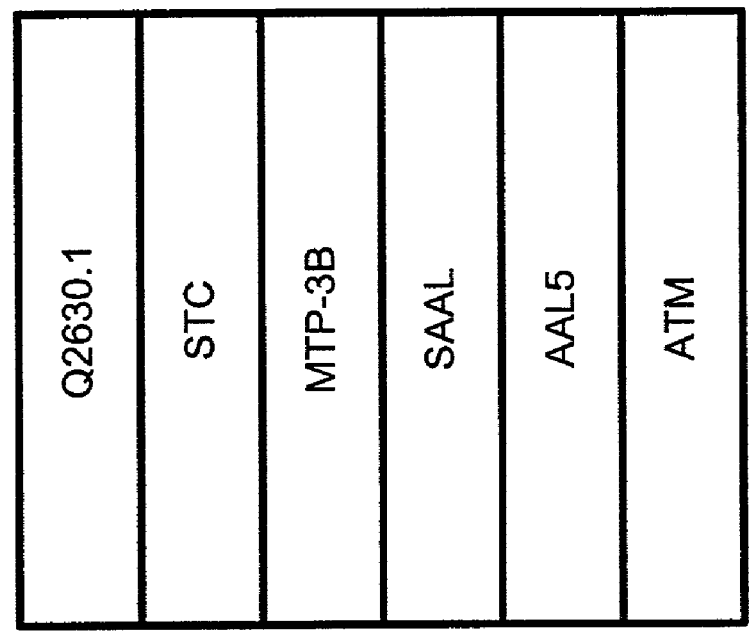

FIG. 6A and FIG. 6B show protocol stacks on the ATM network and IP network, respectively, for the FIG. 5A and FIG. 5B option of using q.aal signaling over the IP network to and from the IP node to implement the interworking. FIG. 6A and FIG. 6B show that q.aal2 messages are carried over either ATM (in FIG. 6A) or IP (in FIG. 6B). The use of M3UA is shown as an example. Other SCTP adaptation methods may be used.

In the foregoing description of FIG. 5A and FIG. 5B, the same IP address used by interworking gateway 50 for the q.aal2 signaling is used for traffic. The IP node 5B-N can obtain this IP address from the IP header. The interworking gateway 50 has the IP address of the node 5B-N from the q.aal2 message received from the ATM SRNC node 5B-26.

Optimization Feature using Application Level Signaling

In one of its aspects, the present invention also provides an optimization feature in the event that nodes on both side of the interface (Iu interface, Iur interface, or Iub interface) are IP-connected nodes. This optimization feature facilitates determination of whether both nodes are, in fact, IP-connected nodes, and then permits exchange of IP information). If both nodes are not IP-connected nodes, transport bearer establishment with interworking capabilities are employed in accordance with the invention.

One possible mode of operation exchanges transport information in application signaling in one direction only and relies on transport bearer signaling which is consistent with 3GPP release 99. Another mode is to exchange all transport bearer information with application signaling. Both modes can be supported as long as rules for backward compatibility are followed. For sake of illustration only, these rules are below described in the example context of a serving RNC (SRNC) node and a non-serving RNC (SRNC) node, but have broader applicability to other nodes as previously mentioned.

The operational rules for the IP-connected SRNC node are listed as S1–S3 below:

S1: The new IP-connected SRNC node includes an IP address and IP endpoint identifier for uplink traffic in an "IP transport bearer container" of the initiating application control message, in such a way that it would be ignored by a non-IP node (e.g., ignored by a 3GPP R99 node, for example).

S2: If an IP transport bearer container is received from a node in an application control response message, the transport bearer is considered as being established.

S3: If an IP transport bearer container is not received from a node in the application control response message, but instead a normal AAL2 response message is received (with, e.g., an AAL2 address and reference), then resort is made to the first mode (e.g., interworking with q.aal2 signaling as described above).

The operational rules for the IP-connected non-SRNC node are listed as D1–D3 below:

D1: If the non-SRNC node receives an application control message without the IP transport bearer container, the non-SRNC node assumes that the SRNC node is an AAL2/ATM node, and therefore the non-SRNC node returns the transport addresses in AAL2/ATM-compatible format (e.g., in accordance with 3GPP R99 specifications). Thereafter, resort is made to the first mode (e.g., interworking with q.aal2 signaling as described above).

D2: If the non-SRNC node receives an application control message with the IP transport bearer container, the non-SRNC node includes a container in the RNSAP response message. The IP transport bearer container (and thus the RNSAP response message) includes the IP address and IP endpoint identifier for downlink traffic.

Example scenarios illustrating this optimization feature are provided in FIG. 7A, FIG. 7B, and FIG. 7C. Again, for sake of convenience and example, these scenarios are described in the non-limiting context of an SRNC node and a non-SRNC node.

FIG. 7A shows communication between an IP SRNC source node 7A-26 and a non-SRNC IP node 7A-N. In accordance with rule S1, the initiating application message 7A-1 issued by IP SRNC source node 7A-26 includes an IP transport bearer container with an IP address and IP endpoint identifier for uplink traffic. Upon receipt of the initiating application message 7A-1, non-SRNC IP node 7A-N detects the presence of the IP transport bearer container and, as required by rule S2, sends an initiation response message 7A-2 which includes an IP transport bearer container. The IP transport bearer container included in initiation response message 7A-2 has an IP address and IP endpoint identifier for downlink traffic. In the scenario of FIG. 7A, upon receipt of the initiation response message 7A-2 the transport bearer is considered to be established.

FIG. 7B shows another scenario in which IP SRNC source node 7B-26 issues initiating application message 7B-1 to non-IP node 7B-N. As in the FIG. 7A scenario, the initiating application message 7B-1 includes an IP transport bearer container with an IP address and IP endpoint identifier for uplink traffic. However, upon receipt of the initiating application message 7B-1 the non-IP node 7B-N is oblivious to the IP transport bearer container included therein. Accordingly, non-IP node 7B-N merely returns the initiation response message 7B-2 with ATM transport addresses in a non-IP format. That is, the initiation response message 7B-2 includes an AAL2 address and SUGR. Therefore, in accordance with rule S3, upon receipt of the initiation response message 7B-2 the IP SRNC node 7B-26 resorts to interworking, such as the interworking with q.aal2 signaling as described above (for example, the situation of FIG. 3A or FIG. 3B).

FIG. 7C shows yet another scenario (illustrating application of rule D1) in which non-IP SRNC node 7C-26 issues initiating application message 7C-1 to IP node 7C-N. Since the SRNC node 7C-26 is not an IP node, the initiating application message 7C-1 does not have the IP transport bearer container. The node 7C-N, being an IP node, is on the outlook for a IP transport bearer container in the initiating application messages which it receives, but detecting no IP transport bearer container in message 7C-1 concludes that the node which initiated message 7C-1 (i.e., node 7C-26) is not an IP node. Accordingly, IP node 7C-N issues an initiation response message with an ATM transport bearer container. In this FIG. 7C scenario, therefore, as in the FIG. 7B scenario, the SRNC node 7B-26 resorts to interworking, such as the interworking with q.aal2 signaling as described above (for example, the situation of FIG. 3A or FIG. 3B).

In view of the fact that the attempt to use the optimization feature was not successful in either the scenario of FIG. 7B or the scenario of FIG. 7C, interworking is employed to establish the transport bearer as previously described (e.g., in the generic cases of FIG. 3A and FIG. 3B, for example). Thus, FIG. 7B and FIG. 7C do not show the transport layer signaling which occurs in such unsuccessful attempts to employ the optimization feature, such transport layer signaling being shown by other embodiments previously described.

Application Signaling Augmented by Transport Layer Interworking

Another mode of implementing interworking for the present invention involves obtaining address and binding identifier parameters to be included in application signaling messages by consulting a transport layer interworking gateway. In this mode, additional signaling occurs in conjunction with the application level signaling.

The obtaining of application signaling parameters (e.g., address and binding identifier parameters to be included in application signaling messages) in accordance with this mode of the invention does not involve an interworking at the application signaling level or termination of the application signaling, but rather consultation of an interworking gateway provided at the transport level.

An example implementation of obtaining application signaling parameters by consulting a transport layer interworking gateway is generally illustrated in FIG. 8. In FIG. 8, node 8-26 can (but need not necessarily) be an SRNC node, while node 8-N can be (for example) a drift RNC node (DRNC), a base station node, or a core network node.

In FIG. 8, the connection initiation node 8-26 is an ATM node while connection receiver node 8-N is an IP node which has the optimization feature capabilities described above. When the IP node 8-N receives initiating application message 8-1, IP node 8-N notes that the connection initiating node is not an IP node but another type of node (e.g., an ATM node). Therefore, in accordance with the second mode of the invention, the receiver node (IP node 8-N) sends an application-augmenting interworking request (App IW Request) message 8-1-1 to interworking gateway 80.

The purpose of the application-augmenting interworking request message 8-1-1 is basically to obtain an AAL2 address and SUGR to send back to ATM node 8-26. The application-augmenting interworking request message 8-1-1 includes the following: an IP address (IPreceive) of the receiving node (e.g., node 8-N); the connection identifier accorded by the receiving node (CEIDreceive), and a request for an AAL2 address and SUGR to send to SRNC 8-26 (denoted as req[aal2 address, SUGR]) and a request for both an IP address for interworking gateway 80 and for a connection identifier used by interworking gateway 80 (denoted as req[IPg, CEIDg] in FIG. 8).

Upon receipt of application-augmenting interworking request message 8-1-1, interworking gateway 80 obtains the requested information and sends an application-augmenting interworking response message 8-1-2 to node 8-N. The response message 8-1-2 includes the AAL2 address of interworking gateway 80 (AAL2g); a SUGR for interworking gateway 80 (SUGRg); and IP address for interworking gateway 80 (Ipg); and a CEID for interworking gateway 80 (CEIDg), all as requested in the application-augmenting interworking request message 8-1-1. Thus, interworking gateway 80 and the IP receiver node 8-N exchange IP connection information for both directions.

Using the information gained from the application interworking response message 8-1-2, the connection receiver node (e.g., node 8-N) can issue its initiation response message 8-2 to the ATM-based SRNC node 8-26. The initiation response message 8-2 includes both the AAL2 address of interworking gateway 80 (AAL2g) and the SUGR for interworking gateway 80 (SUGRg) as acquired from the application interworking response message 8-1-2.

Upon receipt of the initiation response message 8-2, ATM-based SRNC node 8-26 establishes an AAL2 connection with interworking gateway 80 using the Establish Request message 8-3. At this point the connection information for the IP network is already established, so that full connectivity is in place for the IP network. Accordingly, the interworking gateway 80 responds to the Establish Request message 8-3 with an Establish Confirmation message 8-4. The Establish Request message 8-3 and Establish Confirmation message 8-4 have essentially the same parameters as comparable AAL2 messages illustrated in FIG. 5A, for example.

For application signaling augmented by transport layer interworking, FIG. 4B serves as an example scenario when the connection initiating node is the IP-based node and the connection receiver node is the ATM node. For the FIG. 8 scenario, basic information that is included when user data is sent understood with reference to the earlier described traffic flows of FIG. 4A(1) and FIG. 4B(1), respectively, for example.

In the case of the Iu interface where the MSC provides the ATM transport parameters, the ATM and IP parameters will be obtained from the gateway before sending the initiating application message. The initiating application message will include the ATM transport parameters received from the gateway. The RNC will then establish an AAL2 connection with the gateway.

Interworking WITH Tunneling

Yet another mode of implementing interworking for the present invention involves tunneling. Tunneling mechanisms can be used when it is not a requirement that transport connections be established before data is sent and it does not matter which node initiates the AAL2 connection. In tunneling, two independent unidirectional flows on both the IP and AAL2 side are established. For tunneling, the bearer transport information can be included in the application signaling messages.

FIG. 9A illustrates a first case of tunneling in which data is sent from an IP node to an ATM node. In the illustration of FIG. 9B, the data is sent from ATM node 9A-N to IP node 9A-26. FIG. 9A shows that the IP node 9A-26 has received, via application control signaling message 9A-1, the E.164 address and SUGR(CEIDa) of the ATM node 9A-N. In the notation "CEIDa", the "a" refers to the ATM node 9A-N.

FIG. 9A further shows, as user data flow 9A-2, user data being transmitted from IP-based node 9A-26 toward ATM node 9A-N. In the user data flow of 9A-2, an IP packet is constructed as if it were to be routed to the ATM node using the E.164 address as an Ipv6 packet. The CEID (SUGR) for the flow to the ATM node is included in the application header. As shown by the stack in FIG. 9A, this packet is encapsulated in another IP packet addressed to the IP gateway 90 in order to tunnel it to the gateway 90. The address for the IP gateway 90 is known in advance (e.g., preconfigured, and possibly chosen based on E.164 address).

When gateway 90 receives the packet, it looks at the encapsulated address and CEID and checks if an AAL2 connection already exists for this connection identifier. Whenever a connection already exists, information has been stored about the connection and thus serves as an indication of the existence of the connection. Also, part of the connection information is the AAL2 connection to use toward the ATM node which is derived from mapping directly from the destination address/CEID(SUGR). If there is no AAL2 connection corresponding to the destination address/CEID (SUGR), then one is initiated by gateway 90 to the ATM node 9A-N as represented by step 9A-3 in FIG. 9A. The connection will be unidirectional in the sense that for the direction toward gateway 90, the traffic link parameters can be set to zero so that no resources are used for that direction.

For a second case illustrated in FIG. 9B, data is to be sent from the ATM node 9B-N to the IP node 9B-26. The ATM node 9B-N has received the IP address of the IP node 9B-26, and the CEID for the IP node 9B-26 (CEIDsmc), via application control signaling as shown by message 9B-1. The ATM node 9B-N establishes an AAL2 connection with the IP gateway 90, as depicted by step 9B-2 in FIG. 9B. For the data flow represented by 9B-3 in FIG. 9B, the ATM node 9B-N includes the IP address of the IP endpoint node (e.g., IP node 9B-26) in the Served User Transport (SUT) field in the q.aal2 connection request message. This AAL2 connection is also unidirectional from a resource allocation perspective. When the gateway 90 receives the connection request message, it associates the SUGR and the IP address to the AAL2 connection established. For data received on that link, the gateway 90 creates an IP packet with the destination address of the IP node that was received in the SUT. This IP packet is included in the data flow represented by 9B-4 in FIG. 9B. The SUGR is used in the header as the CEID. When the IP node 9B-26 receives the data, it can associate the CEID with the application.

Thus, in the tunneling embodiments of the invention, no transport bearer signaling is required for the IP network.

Multiple Steps of Interworking

The present invention also encompasses the potential use of multiple interworking steps. For example, there can be the multiple steps of IP-ATM-IP interworking (e.g., an IP/ATM interworking followed subsequently by an ATM/IP interworking).

Figure 10A:
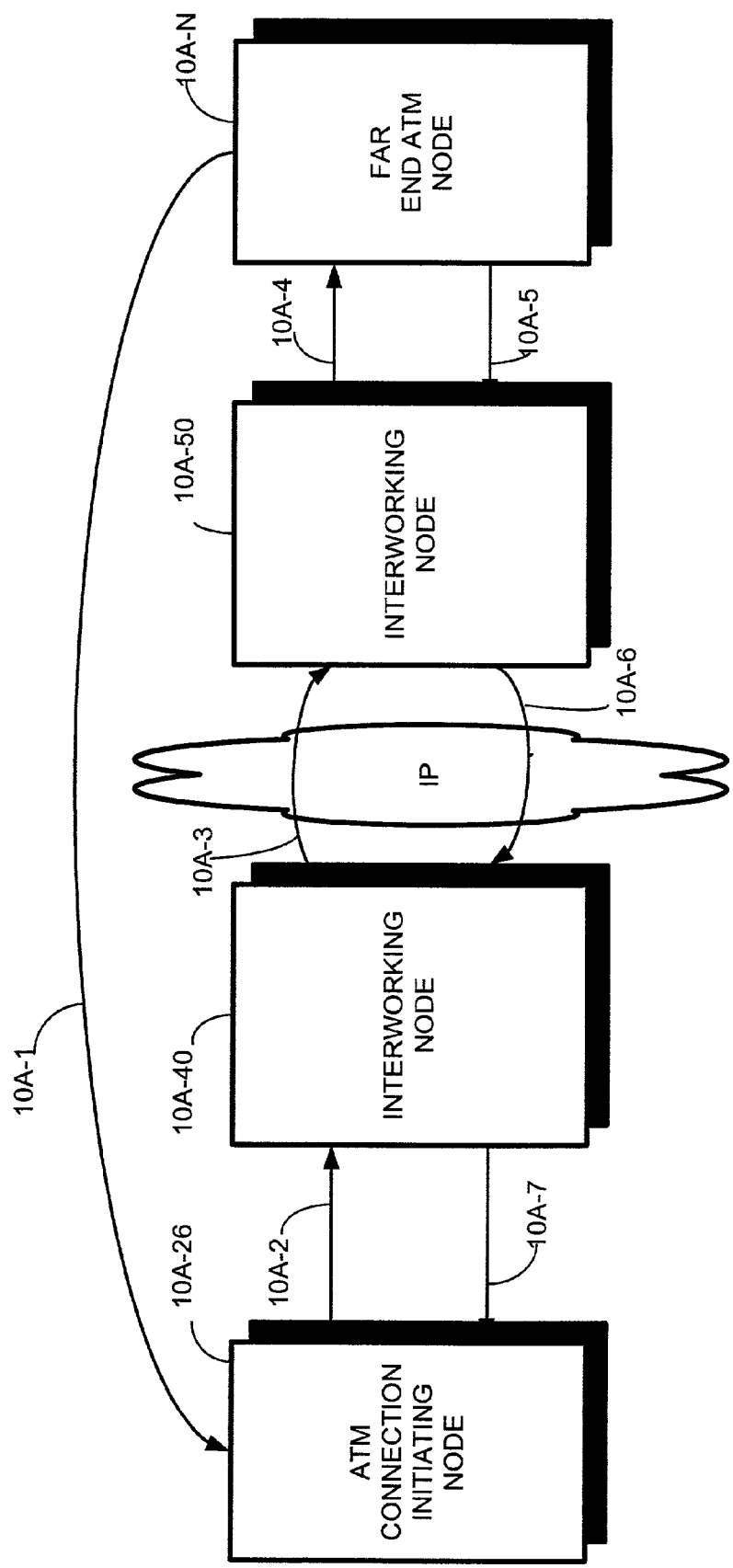
FIG. 10A and FIG. 10B are diagrammatic views showing examples of multiple stages or steps of interworking according to an embodiment of the present invention.

An example situation of ATM-IP-ATM interworking, shown in FIG. 10A, involves an ATM connection initiator node 10A-26 receiving addresses/SUGR from a far end ATM node 10A-N, as depicted by 10A-1. These two ATM nodes do not have ATM connectivity with each other, and there is an IP network 10A-30 between the two ATM nodes. In this situation, the ATM connection initiator node 10A-26 sends q.aal2 signaling 10A-2 toward an interworking node 10A-40. The interworking node 10A-40 sends a message 10A-3 to an IP address of another interworking node 10A-50. This message 10A-3 includes the address of the end ATM node 10A-N and the SUGR, as well as the IP address and connection endpoint identifier (CEID) that the second interworking node 10A-50 should use to send data to it. The second interworking node 10A-50 uses the destination ATM node address and SUGR to initiate an AL2 connection to the end ATM node, represented by 10A-4. The end ATM node 10A-N sends an establish confirm message 10A-5 back to the second interworking node 10A-50. The second interworking node 10A-50 sends a message 10A-6 to the first interworking node 10A-40 with the IP address and CEID to be used for sending data to it and some reference so that the first interworking node 10A-40 can associate this message with the connection being established. Finally, the first interworking node 10A-40 sends an establish confirmation to the initiating ATM node 10A-26.

Figure 10B:
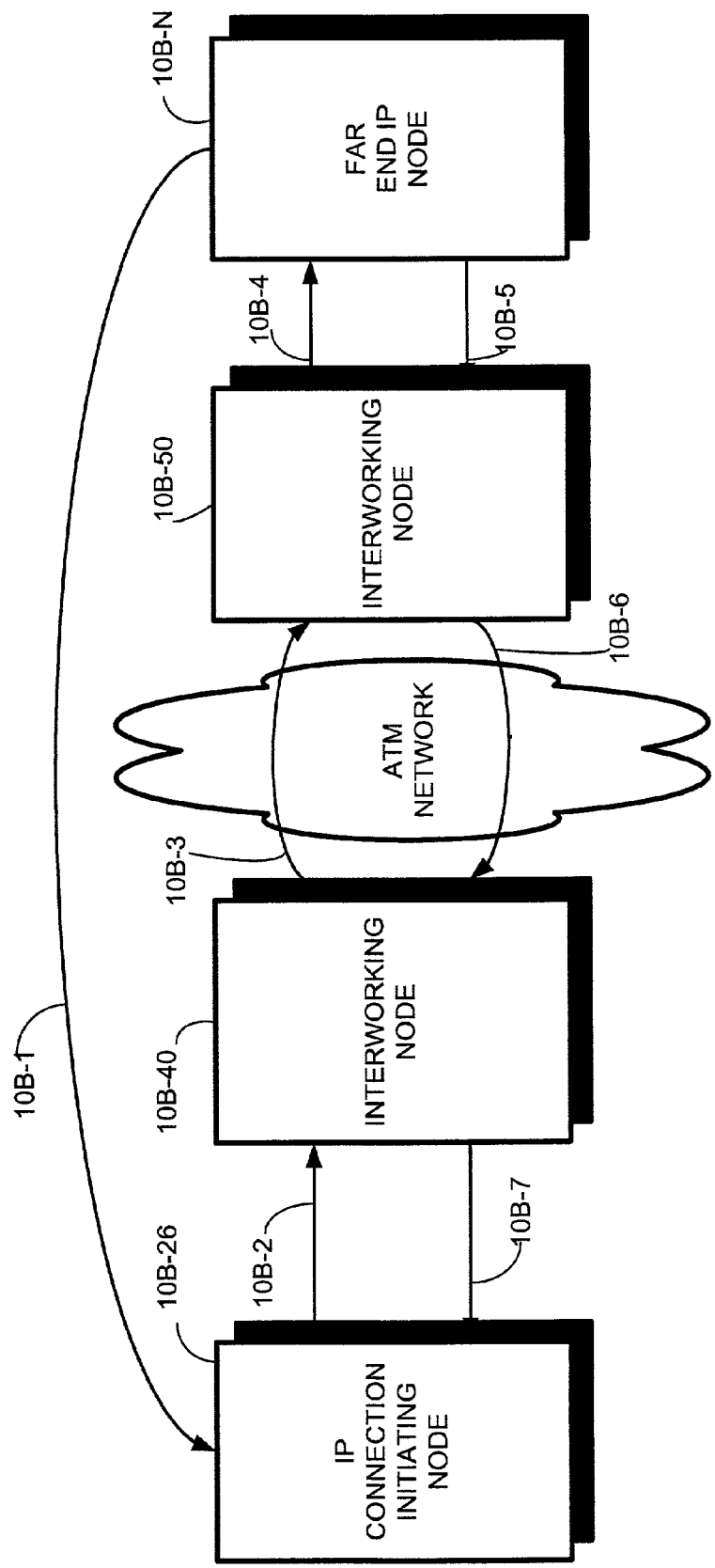

Alternatively, there can be the multiple steps of IP-ATM-IP interworking. An example situation of IP-ATM-IP interworking is illustrated in FIG. 10B, wherein an IP connection initiator node 10B-26 is connected to a far end IP node 10B-N via ATM network 10B-3. The node 10B-26 is connected to ATM network 10B-3 via interworking node 10B-40; the node 10B-N is connected to ATM network 10B-3 via interworking node 10B-50.

For sake of convenience the ATM nodes in the ATM networks of the figures have been illustrated as being directly connected to an appropriate interworking gateway node. However, in view of the fact that AAL2 is a switching technology, it should be understood that one or more ATM switches may reside between the ATM node involved in the connection and the interworking gateway node.

It is possible that a node may have both ATM and internet protocol (IP) interfaces. In such case, the interworking function can be performed in the node which has both ATM and internet protocol (IP) interfaces (rather than in a separate node as shown in various figures hereof).

In many examples described above, E.164 addresses have been utilized, e.g., with AAL2. Although E.164 addressing is particularly convenient for use with AAL2, it should be understood that the invention is not so limited and that other types of addressing are also envisioned.

Various embodiments of the present invention provide numerous advantages. Among the advantages are the following:

Connection initialization is initiated by the same node within a particular network architecture, regardless of whether it is an ATM network or an IP network.

The application layer (e.g., radio access network layer) signaling is NOT affected. For example, the application layer (e.g., radio access network layer) signaling is not terminated in order to change only transport-related parameters within the signaling messages.

The interworking is preferably performed only at the transport layer.

Except for the tunneling embodiments, transport connections are established before any user data is sent.

Gradual migration is allowed from AAL2/ATM transport to IP transport with full connectivity between all nodes.

Some nodes in the network are allowed to use only one transport technology, and others to use only another transport technology.

The general architecture and principles of 3GPP UTRAN R99 are preserved, and there is minimal impact on application layer (e.g., radio access network) protocols.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A telecommunications system having an application layer and a transport layer, the system comprising:
   a first node which utilizes a first transport technology;
   a second node which utilizes a second transport technology;
   wherein the first transport technology and the second transport technology are interworked for facilitating establishment of a transport bearer between the first node and the second node without terminating or interworking with application control signaling in the application layer;
   wherein the application layer executes a radio network layer procedure to initiate the transport bearer in a radio access network of a wireless telecommunications system.

2. The system of claim 1, further comprising a transport layer interworking gateway connected between the first node and the second node.

3. The system of claim 1, further comprising a transport layer interworking gateway, and wherein the interworking gateway receives an establish request message carried by the first transport technology and converts an address of the second node borne by the establish request message to an address usable by the second transport technology, and wherein the interworking gateway employs the address usable by the second transport technology to send a bearer signaling message to the second node.

4. The system of claim 1, wherein the first technology is ATM and the second technology is internet protocol (IP).

5. The system of claim 4, wherein the bearer signaling message is in an IP bearer control protocol and includes a binding identifier obtained from the second node.

6. The system of claim 5, wherein after receipt of the bearer signaling message the second node sends an IP response message to the interworking gateway, the IP response message including information enabling establishment of a unidirectional connection from the interworking gateway to the second node.

7. The system of claim 6, wherein after receipt of the IP response message, the interworking gateway sends an establish confirmation message to the first node.

8. The system of claim 1, further comprising a transport layer interworking gateway, and wherein the first node uses an address of the second node to determine an address for the interworking gateway, and wherein the first node sends a bearer signaling message to the interworking gateway.

9. The system of claim 8, wherein the bearer signaling message is in an IP bearer control protocol and includes an address of the second node, a binding identifier obtained from the second node, and IP connection information necessary for the interworking gateway to establish a unidirectional connection to the first node.

10. The system of claim 9, wherein upon receiving the bearer signaling message, the interworking gateway sends an establish request message towards the second node, and wherein upon receipt of the establish request message the second node sends an establish confirmation message toward the interworking gateway.

11. The system of claim 10, wherein the establish request message and the establish confirmation message are q.aal2 messages.

12. The system of claim 10, wherein upon receipt of the establish confirmation message the interworking gateway sends an IP response message to the first node, the IP response message including IP connection information necessary for the first node to establish a unidirectional connection to the interworking gateway.

13. The system of claim 1, wherein an interworking function interworks the first technology and the second technology at one of the first node and the second node.

14. The system of claim 1, wherein an interworking function interworks the first technology and the second technology at a node distinct from the first node and the second node.

15. A telecommunications system having an application layer and a transport layer, the system comprising:
a first node which utilizes a first transport technology;
a second node which utilizes a second transport technology;
wherein the first transport technology and the second transport technology are interworked for facilitating establishment of a transport bearer between the first node and the second node without terminating or interworking with application control signaling in the application layer;
wherein an interworking function interworks the first technology and the second technology using q.aal2 signaling.

16. The system of claim 15, wherein one of the transport technologies is an internet protocol (IP), and wherein the interworking function involves using internet protocol (IP) specific signaling over an internet protocol (IP) network.

17. The system of claim 15, wherein one of the first and the second node is an internet protocol (IP) node, and wherein the interworking function involves using q.aal2 signaling over an internet protocol (IP) network to/from the internet protocol (IP) node.

18. A telecommunications system having an application layer and a transport layer, the system comprising:
a first node which utilizes a first transport technology;
a second node which utilizes a second transport technology;
wherein the first transport technology and the second transport technology are interworked for facilitating establishment of a transport bearer between the first node and the second node without terminating or interworking with application control signaling in the application layer;
wherein the first node is an IP-connected node which attempts to establish the transport bearer using application level signaling, but when unsuccessful invokes an interworking function for establishing the transport bearer.

19. A telecommunications system having an application layer and a transport layer, the system comprising:
a first node which utilizes a first transport technology;
a second node which utilizes a second transport technology;
wherein the first transport technology and the second transport technology are interworked for facilitating establishment of a transport bearer between the first node and the second node without terminating or interworking with application control signaling in the application layer;
wherein the first node is an IP-connected node which includes its IP address and IP endpoint identifier for uplink traffic in an IP transport bearer container sent to the second node in an initiating application control message, wherein if an IP transport bearer container is received from the second node in an application control response message, the transport bearer is considered as being established, and otherwise the interworking function is invoked by the first node.

20. A telecommunications system having an application layer and a transport layer, the system comprising:
a first node which utilizes a first transport technology;
a second node which utilizes a second transport technology;
wherein the first transport technology and the second transport technology are interworked for facilitating establishment of a transport bearer between the first node and the second node without terminating or interworking with application control signaling in the application layer;
wherein an IP-connected node obtains address parameters of a transport layer interworking gateway from the transport layer interworking gateway for inclusion in application layer signaling to the first node.

21. The system of claim 20, wherein the first node is not an IP-connected node but the second node is an IP-connected node, wherein upon receipt of an initiating application message from the first node, the second node obtains from the transport level interworking gateway a network address of the interworking gateway and a binding identifier of the interworking gateway to send back to the first node, wherein the second node establishes a bidirectional IP connection with the interworking gateway; and wherein the first node uses the network address of the interworking gateway and the binding identifier of the interworking gateway to establish a connection with the interworking gateway.

22. A telecommunications system having an application layer and a transport layer, the system comprising:
a first node which utilizes a first transport technology;
a second node which utilizes a second transport technology;
wherein the first transport technology and the second transport technology are interworked for facilitating establishment of a transport bearer between the first node and the second node without terminating or interworking with application control signaling in the application layer;
wherein a tunneling mechanism is utilized to interwork the first technology and the second technology.

23. For use in a telecommunications system having an application layer and a transport layer, the system comprising a first node which utilizes a first transport technology and a second node which utilizes a second transport technology, a method comprising:
interworking the first transport technology and the second transport technology to facilitate establishment of a transport bearer between the first node and the second node without terminating or interworking with auplication control signaling in the application layer;

executing at the application layer a radio network layer procedure to establish the transport bearer in a radio access network (RAN) of a wireless telecommunications method.

24. The method of claim 23, further comprising connecting a transport layer interworking gateway between the first node and the second node.

25. The method of claim 24, further comprising:

receiving at an interworking gateway an establish request message carried by the first transport technology;

converting an address of the second node borne by the establish request message to an address usable by the second transport technology;

the interworking gateway employing the address usable by the second transport technology to send a bearer signaling message to the second node.

26. The method of claim 25, wherein the first technology is ATM and the second technology is an internet protocol (IP).

27. The method of claim 26, wherein the bearer signaling message is in an IP bearer control protocol and includes a binding identifier obtained from the second node.

28. The method of claim 27, further comprising, after receipt of the bearer signaling message, the second node sending an IP response message to the interworking gateway, the IP response message including information enabling establishment of a unidirectional connection from the interworking gateway to the second node.

29. The method of claim 28, further comprising, after receipt of the IP response message, the interworking gateway sending an establish confirmation message to the first node.

30. The method of claim 23, further comprising:

the first node using an address of the second node to determine an address for an interworking gateway; and the first node sending a bearer signaling message to the interworking gateway.

31. The method of claim 30, wherein the bearer signaling message is in an IP bearer control protocol, and wherein the method comprises including in the IP bearer signaling message an address of the second node, a binding identifier obtained from the second node, and IP connection information necessary for the interworking gateway to establish a unidirectional connection to the first node.

32. The method of claim 31, further comprising:

upon receiving the bearer signaling message, the interworking gateway sending an establish request message towards the second node; and upon receipt of the establish request message the second node sending an establish confirmation message toward the interworking gateway.

33. The method of claim 32, wherein the establish request message and the establish confirmation message are q.aal2 messages.

34. The method of claim 32, further comprising upon receipt of the establish confirmation message the interworking gateway sending an IP response message to the first node, the IP response message including IP connection information necessary for the first node to establish a unidirectional connection to the interworking gateway.

35. The method of claim 23, further comprising using an interworking function to interwork the first technology and the second technology at one of the first node and the second node.

36. The method of claim 23, further comprising using an interworking function to interwork the first technology and the second technology at a node distinct from the first node and the second node.

37. For use in a telecommunications system having an application layer and a transport layer, the system comprising a first node which utilizes a first transport technology and a second node which utilizes a second transport technology, a method comprising:

interworking the first transport technology and the second transport technology to facilitate establishment of a transport bearer between the first node and the second node without terminating or interworking with application control signaling in the application layer;

using q.aal2 signaling to interwork the first technology and the second technology.

38. The method of claim 37, wherein one of the transport technologies is an internet protocol (IP), and further comprising performing interworking using internet protocol (IP) specific signaling over an internet protocol (IP) network.

39. The method of claim 37, wherein one of the first and the second node is an internet protocol (IP) node, and further comprising performing interworking using q.aal2 signaling over an internet protocol (IP) network to/from the internet protocol (IP) node.

40. For use in a telecommunications system having an apnlication layer and a transport layer, the system comprising a first node which utilizes a first transport technology and a second node which utilizes a second transport technology, wherein the first node is an IP-connected node, a method comprising:

interworking the first transport technology and the second transport technology to facilitate establishment of a transport bearer between the first node and the second node without terminating or interworking with application control signaling in the application layer:

the first node attempting to establish the transport bearer using application level signaling, but when unsuccessful the first node invoking an interworking function for establishing the transport bearer.

41. For use in a telecommunications system having an application layer and a transport layer, the system comprising a first node which utilizes a first transport technology and a second node which utilizes a second transport technology, wherein the first node is an IP-connected node, a method comprising:

interworking the first transport technology and the second transport technology to facilitate establishment of a transport bearer between the first node and the second node without terminating or interworking with application control signaling in the anplication layer;

the first node including its IP address and IP endpoint identifier for uplink traffic in an IP transport bearer container sent to the second node in an initiating application control message;

wherein if an IP transport bearer container is received from the second node in an application control response message, considering the transport bearer to be established, and otherwise invoking interworking by the first node.

42. For use in a telecommunications system having an application layer and a transport layer, the system comprising a first node which utilizes a first transport technology and a second node which utilizes a second transport technology, wherein the second node is an IP-connected node, a method comprising:

interworking the first transport technology and the second transport technology to facilitate establishment of a transport bearer between the first node and the second node without terminating or interworking with application control signaling in the application layer;

obtaining address parameters of a transport layer interworking gateway from the transport layer interworking gateway for inclusion in application layer signaling to the first node.

43. The method of claim 42, wherein the first node is not an IP-connected node but the second node is an IP-connected node, the method further comprising:

upon receipt of an initiating application message from the first node, the second node obtaining from the transport level interworking gateway a network address of the interworking gateway and a binding identifier of the interworking gateway to send back to the first node;

the second node establishing a bidirectional IP connection with the interworking gateway; and the first node using the network address of the interworking gateway and the binding identifier of the interworking gateway to establish a connection with the interworking gateway.

44. For use in a telecommunications system having an application layer and a transport layer, the system comprising a first node which utilizes a first transport technology and a second node which utilizes a second transport technology, a method comprising:

interworking the first transport technology and the second transport technology to facilitate establishment of a transport bearer between the first node and the second node without terminating or interworking with application control signaling in the application layer;

using a tunneling mechanism to interwork the first technology and the second technology.

45. A telecommunications system having an application layer and a transport layer, the application layer being a radio network layer, the system comprising:

a first node which is connected to use Internet Protocol;

a second node;

wherein the first node attempts to establish a transport bearer between the first node and the second node using application level signaling, but when unsuccessful invokes an interworking function in the transport layer for establishing the transport bearer.

46. The system of claim 45, wherein the first node includes its IP address and IP endpoint identifier for uplink traffic in an IP transport bearer container sent to the second node in an initiating application control message, and wherein if an IP transport bearer container is received from the second node in an application control response message, the transport bearer is considered as being established, and otherwise the interworking function is invoked by the first node.

47. The system of claim 45, further comprising a transport layer interworking gateway connected between the first node and the second node.

48. The system of claim 47, wherein the interworking gateway receives an establish request message carried by the first transport technology and converts an address of the second node borne by the establish request message to an address usable by the second transport technology, and wherein the interworking gateway employs the address usable by the second transport technology to send a bearer signaling message to the second node.

49. The system of claim 48, wherein the first technology is ATM and the second technology is an internet protocol (IP).

50. The system of claim 49, wherein the bearer signaling message is in an IP bearer control protocol and includes a binding identifier obtained from the second node.

51. The system of claim 50, wherein after receipt of the bearer signaling message the second node sends an IP response message to the interworking gateway, the IP response message including information enabling establishment of a unidirectional connection from the interworking gateway to the second node.

52. The system of claim 51, wherein after receipt of the IP response message, the interworking gateway sends an establish confirmation message to the first node.

53. The system of claim 45, wherein the first node uses an address of the second node to determine an address for the interworking gateway, and wherein the first node sends a bearer signaling message to the interworking gateway.

54. For use in a telecommunications system having an application layer and a transport layer, the application layer being a radio network layer, the system comprising a first node which is connected to use Internet Protocol and a second node, a method comprising attempting to establish a transport bearer between the first node and the second node using application level signaling, but when unsuccessful invoking an interworking function in the transport layer for establishing the transport bearer.

55. The method of claim 54, further comprising:

the first node including its IP address and IP endpoint identifier for uplink traffic in an IP transport bearer container sent to the second node in an initiating application control message;

upon receiving an IP transport bearer container from the second node in an application control response message, considering the transport bearer as being established, but otherwise invoking the interworking function.

56. The method of claim 54, further invoking the interworking function involves accessing a transport layer interworking gateway connected between the first node and the second node.

57. The method of claim 56, further comprising:

upon receiving at the interworking gateway an establish request message carried by the first transport technology, converting an address of the second node borne by the establish request message to an address usable by the second transport technology; and employing the address usable by the second transport technology to send a bearer signaling message to the second node.

58. The method of claim 57, wherein the first technology is ATM and the second technology is an internet protocol (IP).

59. The method of claim 58, further comprising forming the bearer signaling message in an IP bearer control protocol and including in the bearing signaling message a binding identifier obtained from the second node.

60. The method of claim 59, further comprising after receipt of the bearer signaling message, the second node sending an IP response message to the interworking gateway, the IP response message including information enabling establishment of a unidirectional connection from the interworking gateway to the second node.

61. The method of claim 60, further comprising, after receipt of the IP response message, the interworking gateway sending an establish confirmation message to the first node.

62. The method of claim 61, further comprising:
- the first node using an address of the second node to determine an address for the interworking gateway; and
- the first node sending a bearer signaling message to the interworking gateway.

63. A telecommunications system having an application layer and a transport layer, the application layer being a radio network layer, the system comprising:
- a first node;
- a second node which is connected to use Internet Protocol;
- a transport layer interworking gateway;
- wherein the second node obtains address parameters of the transport layer interworking gateway from the transport layer interworking gateway for inclusion in application layer signaling to the first node in order to enable the first node to use the transport layer interworking gateway for the purpose of establishing a transport bearer between the first node and the second node.

64. The system of claim 63, wherein the first node is not an IP-connected node but the second node is an IP-connected node, wherein upon receipt of an initiating application message from the first node, the second node obtains from the transport level interworking gateway a network address of the interworking gateway and a binding identifier of the interworking gateway to send back to the first node, wherein the second node establishes a bidirectional IP connection with the interworking gateway; and wherein the first node uses the network address of the interworking gateway and the binding identifier of the interworking gateway to establish a connection with the interworking gateway.

65. For use in a telecommunications system having an application layer and a transport layer, the application layer being a radio network layer; the system comprising a first node, a second node which is connected to use Internet Protocol; and a transport layer interworking gateway; a method comprising:
- the second node obtaining address parameters of the transport layer interworking gateway for inclusion in application layer signaling to the first node, thereby enabling
- the first node using the transport layer interworking gateway for the purpose of establishing a transport bearer between the first node and the second node.

66. The method of claim 65, wherein the first node is not an IP-connected node but the second node is an IP-connected node, further comprising:
- upon receipt of an initiating application message from the first node, the second node obtaining from the transport level interworking gateway a network address of the interworking gateway and a binding identifier of the interworking gateway for the second node to send back to the first node;
- the second node establishing a bidirectional IP connection with the interworking gateway;
- the first node using the network address of the interworking gateway and the binding identifier of the interworking gateway to establish a connection with the interworking gateway.

* * * * *